United States Patent [19]
Replin

[11] 3,948,563
[45] Apr. 6, 1976

[54] METHOD AND APPARATUS FOR TRANSMITTING TORQUE

[75] Inventor: Henry Replin, Denver, Colo.

[73] Assignee: Vector Wheel Corporation, Denver, Colo.

[22] Filed: Feb. 11, 1974

[21] Appl. No.: 441,194

Related U.S. Application Data

[63] Continuation-in-part of Ser. No. 313,649, Dec. 11, 1972, abandoned.

[52] U.S. Cl. .................. 301/5 R; 64/10; 74/243 PC
[51] Int. Cl.² ......................................... B60B 23/10
[58] Field of Search .................... 64/1 V, 6, 10, 22; 74/243 PC, 230.3; 301/5 R, 63 R, 63 DS, 63 PW

[56] References Cited
UNITED STATES PATENTS
2,622,418  12/1952  Howison ....................... 74/243 PC FOREIGN PATENTS OR APPLICATIONS
714,243   11/1941  Germany ................................ 64/10
1,031,062  5/1958  Germany ................................ 64/10

Primary Examiner—Trygve M. Blix
Assistant Examiner—Reinhard J. Eisenzopf
Attorney, Agent, or Firm—Thomas W. O'Rourke

[57] ABSTRACT

A device and method for transmitting and amplifying torque comprising, an outer member, preferably circular in shape and having support means defined therein, an inner circular member of a diameter less than the diameter of the outer member, the inner member being disposed in the outer member and supported radially therein by the outer member through the support means which will not support other than a load applied radially between the inner member and the outer member, and releasable locking means for sequentially interconnecting the inner member and the outer member at points spaced from the area at which the inner member is radially supported within the outer member, whereby the torque arm between the inner member and the outer member is greater than the torque arm from the center of the inner member to the periphery of the outer member and is applied from a more advantageous location.

32 Claims, 32 Drawing Figures

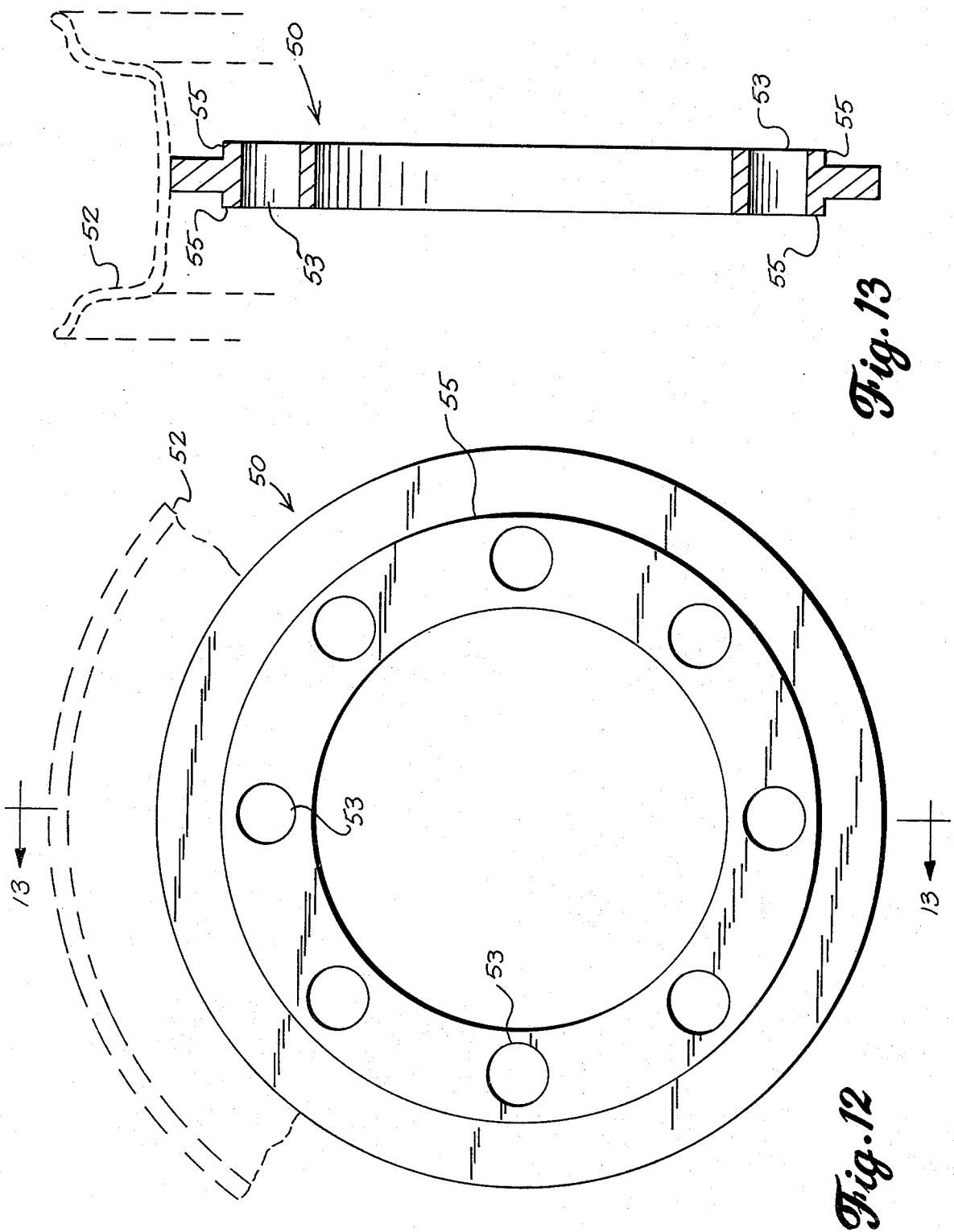

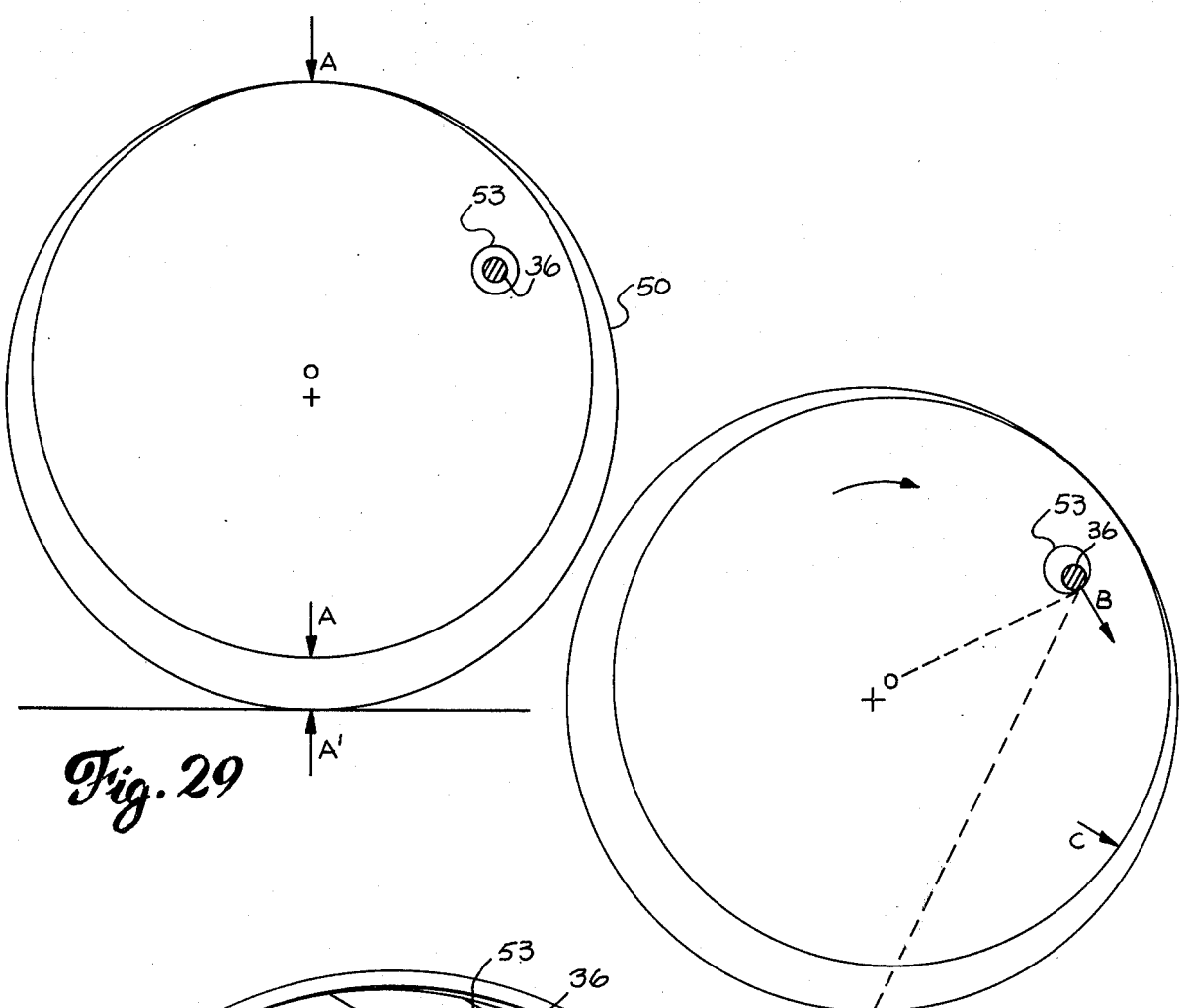
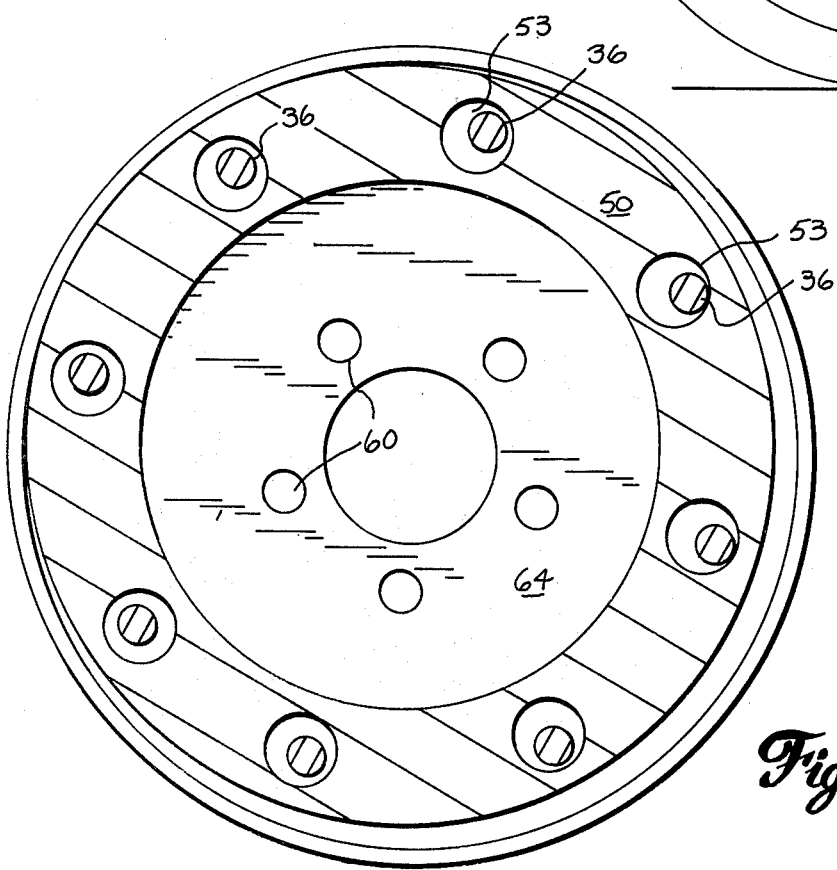
Fig. 29
Fig. 30
Fig. 20

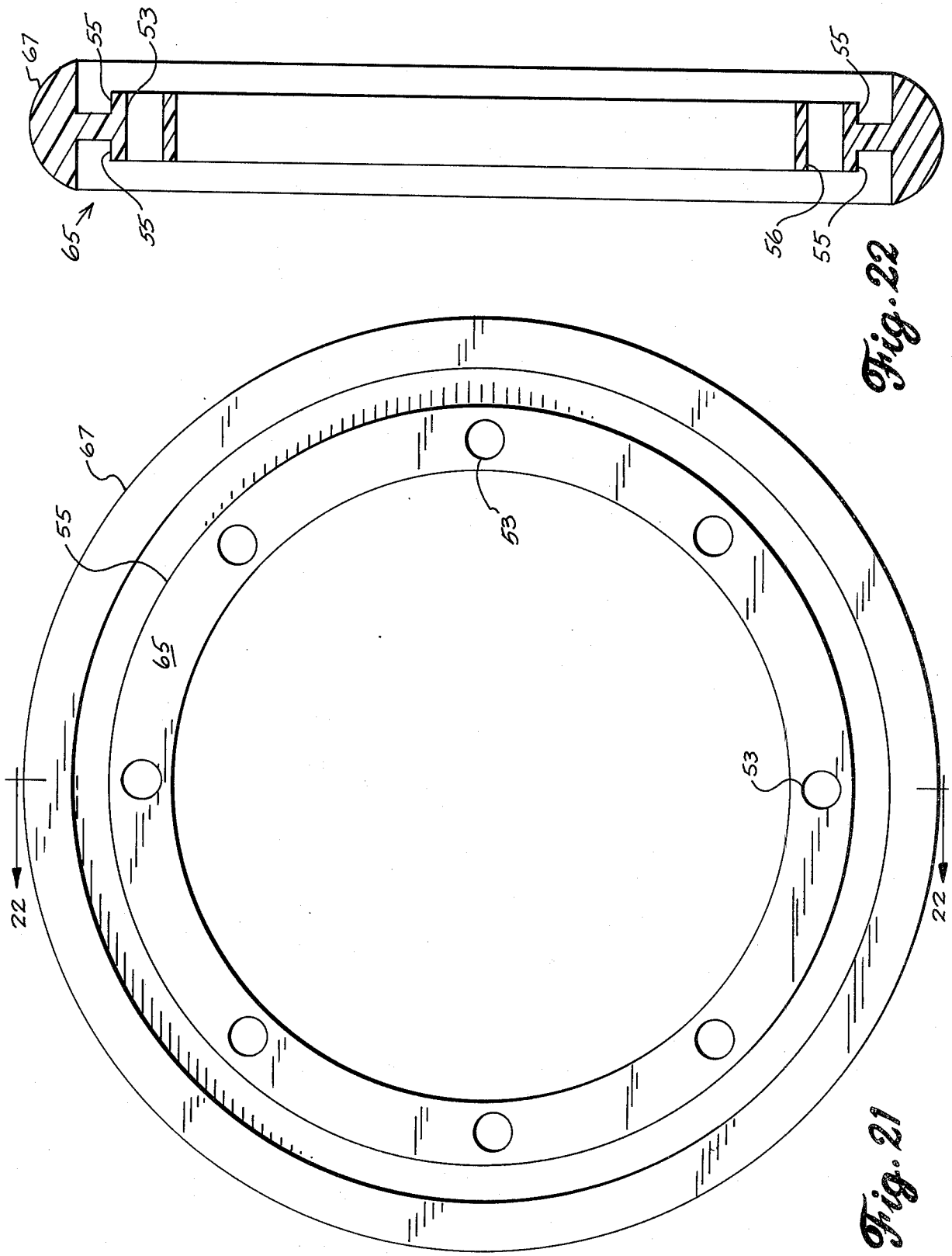

METHOD AND APPARATUS FOR TRANSMITTING TORQUE

This application is a continuation-in-part application of copending U.S. patent application Ser. No. 313,649, filed Dec. 11, 1972, now abandoned.

BACKGROUND OF THE INVENTION

1. Field of the Invention

The instant invention relates generally to a device and method for transmitting, utilizing and enhancing torque and more particularly, to a method and apparatus for transmitting torque through a force couple more advantageously disposed than the conventional force couple between the periphery and center of a wheel.

2. Description of the Prior Art

Transmission of rotary motion through generally circular members such as wheels, pulleys and such has been practiced from the beginning of technology. Torque applied to an axle or other shaft secured to such a circular member is applied through a torque arm from the center of the circular member to the periphery thereof, i.e., through the radius. The resulting force is applied to another surface generally through a frictional interface therewith. In the simple example of an automobile power transmitting wheel, a torque is applied to an axle affixed to the wheel and tire to rotate the wheel and tire assembly. Since the tire bears upon another surface such as a road, the entire assembly must move, the tire must slip on the supporting surface if no translational linear movement occurs, or a combination of the two must occur. Slipping of the tire is undesirable, but occurs when the forces opposing linear movement of the assembly including inertia, a weight component when on a slope, wind resistance, rolling friction, etc., are cumulatively larger than the force which can be transmitted by friction through the interface between the tire and supporting surface, assuming the resulting driving force at the tire-surface portion of the above-discussed conventional radius torque arm is also greater than the frictional force. Since the force which can be transmitted by friction is a function of the weight on the tire and the coefficient of friction between the tire supporting surface, plus a factor for an "interlocking" between the somewhat resilient surfaces, it is conventionally thought that the force which can be transmitted by a given tire carrying a given weight on a given surface is absolutely limited by the frictional interface as defined.

Also, it is conventionally thought that a certain amount of rolling friction is unavoidable. This repesents the "flat spot" at the interface of a wheel and the supporting surface as a result of deformation of the wheel or surface caused by the load bearing on the wheel. Practically, power is consumed in a manner analogous to continuously lifting the wheel and weight thereon from a depression of a dimension corresponding to the amount of cumulative depression between the wheel and supporting surface. Again, taking the familiar example of the automobile, rolling friction is a continuous power consuming drag with resulting increase power consumption and heat generation, and is added to the other resisting forces which must be overcome conventionally by the frictional contact between the supporting surface and wheel. Additional power consumption and wear result from the scrubbing action of the tire on the supporting surface as a result of the deformation.

The above discussion appears to be so basic as to constitute a fundamental law or limit upon the utilization of power applied as torque. However, it is presented here as the closest and most appropriate background matrix within which the instant invention must be considered.

SUMMARY OF THE INVENTION

The instant invention, which provides a heretofore unavailable means and method for utilizing torque between one member and another, comprises a simple inner member disposed within a somewhat larger outer member. Preferably, there is a nonconcentricity between the two members which is usually generated by a radial force applied to one member which causes such member to bear against the other member thereby offsetting the centers of the two members. A bearing or support means having low resistance to shear forces is provided between the members preferably at both the upper portion and bottom portion thereof, but, alternatively at either the upper portion or the bottom portion, to support the radial force but to allow tangential movement between the members. Finally, means to sequentially interlock the two members at another position are provided. The interlock is established at a position other than that at which the radial force is supported through the support means. Accordingly, when rotating, the position at which the radial force is applied, though constant in an absolute sense, varies in a relative sense around the periphery of the members and the interlocking position similarly varies in order that the relative relationship between the area through which the radial force bears between the inner and outer members and the position of interlocking stays constant within certain limits and the two positions do not coincide.

As will be explained in more detail below, the above arrangement provides a torque arm between the point at which the radial force or reaction thereto is supplied to the periphery of the outer member and the point of interlocking. This torque arm is distinct from and more advantageous than the conventional center-to-periphery radial torque arm.

Accordingly, it is an object of the present invention to provide an assembly and method for applying torque in a particularly advantageous manner.

Another object of the present invention is to provide an assembly and method for improving traction between a powered circular member and supporting or driving surface.

Still another object of the present invention is to provide an assembly and method which lowers rolling and sliding friction of a wheel on a surface when torque is applied through the wheel.

Yet another object of the present invention is to provide an assembly and method for positively urging a wheel through linear motion in a manner not primarily dependent or limited by the conventional frictional interface between the wheel and supporting surface.

Still yet another object of the present invention is to provide an assembly and method which affords improved fuel economy in vehicles utilizing wheels for motion.

Yet still another object of the present inventon is to provide an assembly and method for improving braking performance of wheel assemblies.

Yet another object of the present invention is to provide an assembly and method for permitting greater magnitude to torque to be transmitted from a circular member to a surface bearing thereon.

These and other objects and features of the present invention will become apparent from the following description.

BRIEF DESCRIPTION OF THE DRAWINGS

In the drawings:

FIG. 12 is an elevational view of an outer member, including a rim portion, of yet another embodiment of the instant invention;

FIG. 13 is a sectional side view in the plane of line 13—13 of the member shown in FIG. 12;

FIG. 20 is an elevational section view of the assembly shown in FIGS. 18 and 19 which is sectioned in the plane of line 20—20;

FIG. 21 is an elevational view of an element of an assembly useful on a bicycle;

FIG. 22 is a sectional side view in the plane of line 22—22 of the outer member shown in FIG. 21;

FIGS. 29 and 30 are simplified schematic representations of the forces and application of such forces according to the instant invention;

DETAILED DESCRIPTION OF THE INVENTION

Figure 1:
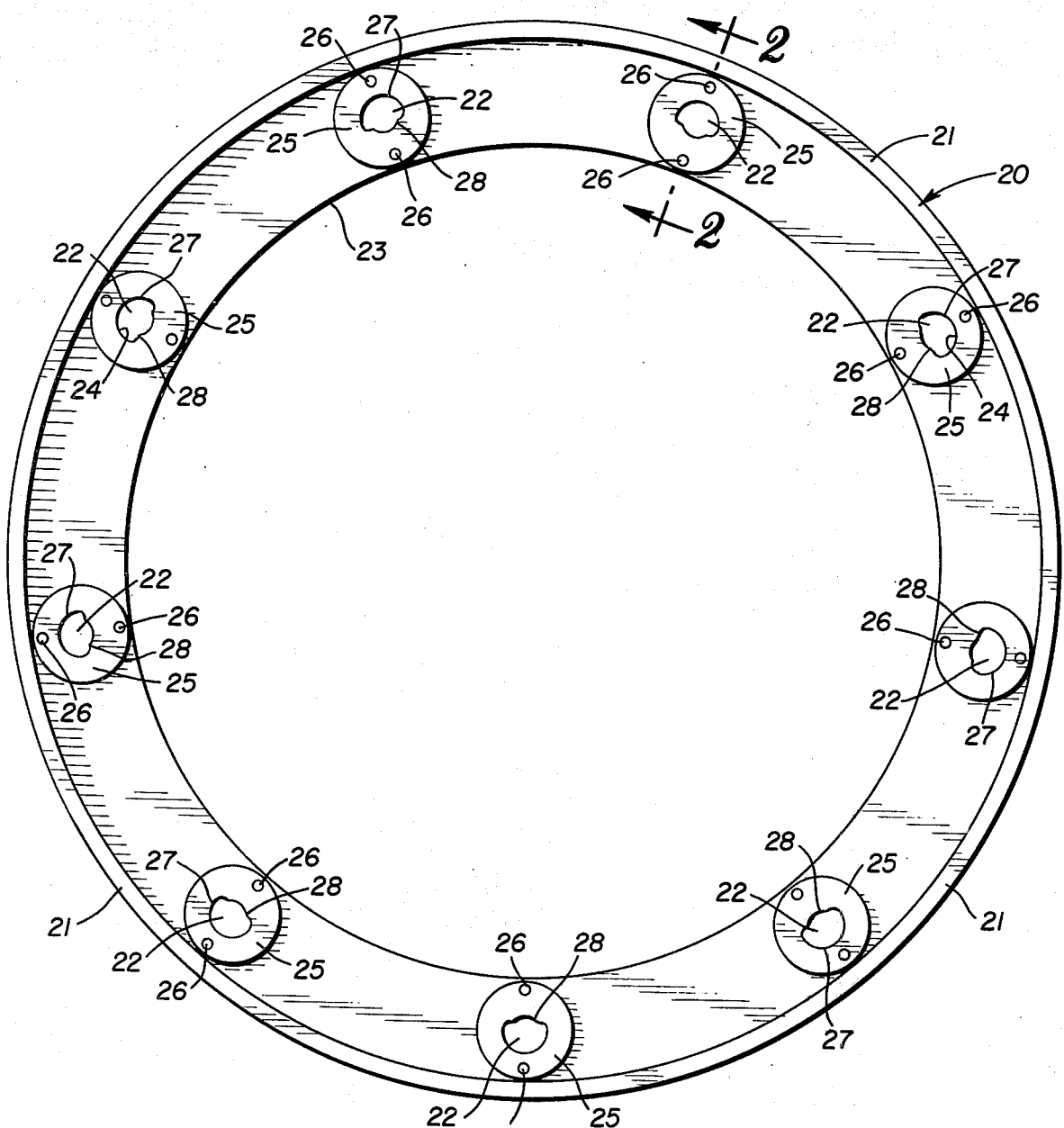
FIG. 1 is an elevational view of one of two identical side surfaces of the outer member of the assembly of the instant invention.

The instant invention concerns a method and apparatus which, through a simple construction, will impart force and movement, and, accordingly, power, from or to a rotating member. Fundamentally, this is accomplished by producing and applying a driving or retarding force at a position remote from the center of rotation of the member in such a manner as to produce a force couple between the position at which the force is applied and a position on the periphery of the member at which a radial force, usually resulting from another surface bearing upon the member, is applied. The resulting force couple urges the member to rotate about an instantaneous center of rotation usually at the position at which the radial force is applied. Such a torque arm is much more advantageous with regard to efficiency, rolling and sliding friction, pulling or stopping power and consumption of energy.

More specifically, the invention comprises an outer member which is preferably circular in shape and has defined therein means for supporting another member, such means preferably being a concentric, preferably circular, cavity or groove. Disposed within the cavity or other means and also preferably circular in shape with a diameter somewhat less than the diameter of the cavity is an inner member.

The inner and outer members are associated and at least limitedly secured together at two distinct positions and in two dissimilar manners. At one position, a radial-force transmitting interface between the inner member and the cavity or other support means is provided. The radial-force transmitting interface will not, however, transmit shear forces between the inner and outer members. Any of a number of mechanically expedients including a pin within an enlarged hole, a simple bearing surface interposed between the surface of the cavity and the periphery of the inner member or an annular projection or projections on one member supported by complementary projection on the other member can be utilized as the interface. Preferably, the radial-force transmitting means is located on a line between the point of application at the radial force and the center of at least one member when no torque is applied to the device.

The other connecting position is a more rigid connection, preferably mechanical, between the inner and outer members which will transmit shear forces and rotary movement between the inner and outer members. Accordingly, when a radial force is imposed on one or the other of the members and the supporting member is precluded from movement, the centers of the inner and outer members are offset with the inner member, in a static condition, being displaced in the direction at which the radial force is transferred from one member to the other. Keeping in mind that the suppport means transmitting the radial force will not transmit rotary or shear forces at a position displaced from the support means, it will be recognized that, if a force tending to rotate one member relative to the other member is applied, the support means will allow initial rotary movement between the members. However, the interlocking means will attempt, as a result of the offset centers, to shift the inner member from the outer member at the point the radial force is applied, and, in essence, transfer the radial force to the position of the interlocking means between the inner and outer members to produce a driving force. However, since the radial force is being continually applied, there is a resulting force couple between the point at which the radial force is transferred and the point at which the radial force is applied to the outer member. This provides a torque arm around the point at which the radial force is applied to the system and the point at which the force is transferred which, in a dynamic situation, is the interlocking means. When the inner and outer members rotate, it must be understood that the radial force is applied in an absolute direction and, when the assembly rotates, moves around the periphery of the outer member and changes in sense of direction at the equal and opposite force through the center of the inner member. At the same time, the interlocking means similarly moves the point of interlock, more conveniently in a step wise or pulsing fashion, to maintain the relative position between the position at which the radial force is applied and the interlocking position to which the radial force is transferred. Accordingly, though the instantaneous center of rotation is constantly changing with respect to the outer member as the point at which the radial force is applied to the outer member in effect moves around the outer member, the overall relationship and torque arm around the instantaneous center at the point at which the radial force is applied is maintained.

Since the composite radial forces between the inner and outer members are equal in magnitude and opposite in direction, it is essentially immaterial as to whether the radial force is thought of as being applied to the inner or outer member since the result is the same. In essence, this is the simple situation as a scale pushing back at a weight with equal and opposite force to that at which the weight pushes upon the scale. Also, it makes little difference with respect to the operation of the apparatus and method as to whether power is transmitted from the inner member to the outer member or, conversely, from the outer member to the inner member. The overall concept and operation of the more advantageous torque arm remains. Relating this to a more simple situation, it makes no difference if the wheel of an automobile is being rotated by the power plant or is retarded by the brakes.

A number of specific arrangements may be employed to provide the radial-force transmitting interface and the interlocking means. In addition to the distinct means described above, a resilient connection between the inner and outer members can be employed. Such a connection will "lock" in tension at the interlocking means position before transmitting torque or shear forces at the redial force transmitting interface.

Figure 2:
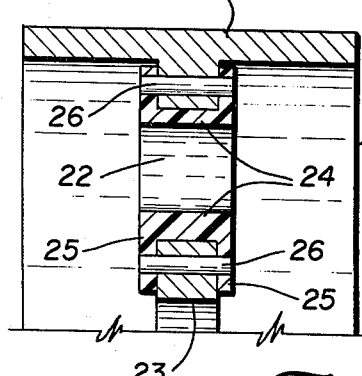
FIG. 2 is a sectional side view in the plane of line 2—2 of FIG. 1.

Turning now to the drawings, where like components are designated by like reference numerals throughout the various figures, a basic device for transmitting torque according to the instant invention is shown in FIGS. 1 through 11. Referring to FIGS. 1 and 2, the outer member 20, or tire wheel, comprises a flat ring provided with a circumferential rim or tire 21, and a plurality of openings 22 located radially midway between the tire 21 and the inner circular edge 23, which is coaxial with tire 21. The more openings 22 provided, the smoother the transfer of power from one member to the other. As shown, the openings 22, which constitute a portion of one interlocking means, are arranged in a equally-spaced annular series with centers 40 degrees apart. Each opening 22 is provided with a lining member of nylon, brass, TEFLON or other suitable bearing material, in the form of a sleeve 24 having a flange 25 at each of the ends thereof. The sleeve 24 fits in an opening 22 and the flanges 25 contact the side surfaces of the outer member 20 and are fastened to the ring by pins or other fastening means 26. Flanges 25 serve as washers in the assembly hereinafter described. The sleeve portion 24, which lines each opening 22, is shaped to fit complementary within the opening to provide bearing surfaces for the pins hereinafter described; the semi-circular bearing surfaces being designated 27 and the irregular bearing surfaces 28, the latter referred to as "program" surfaces.

Figure 3:
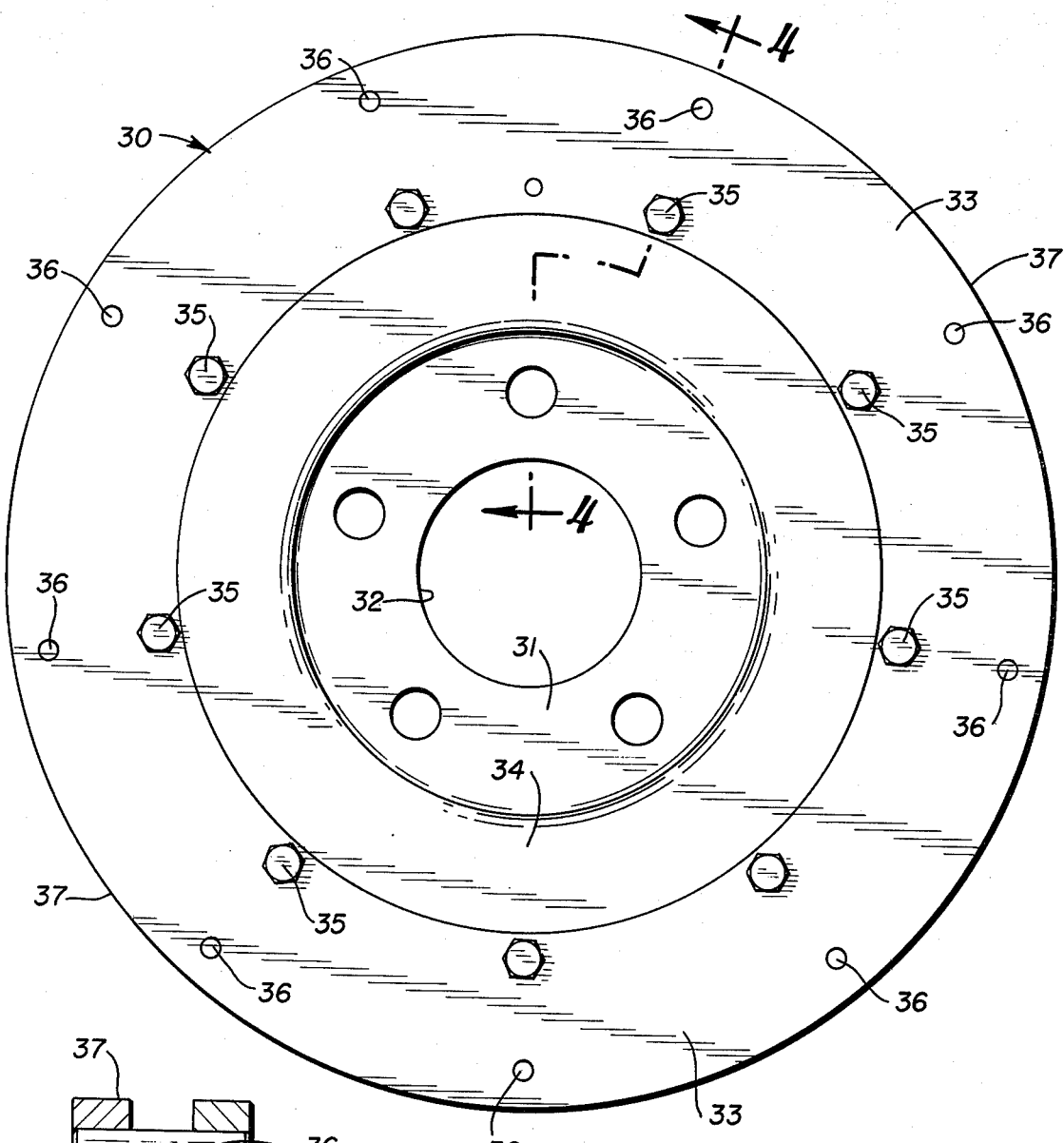
FIG. 3 is an elevational view showing the pin-carrying side of the single disk form of the inner member of the instant invention.
Figure 4:
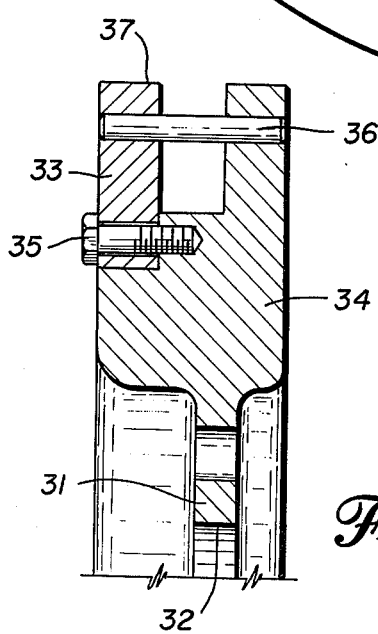
FIG. 4 is a sectional side view in the plane of line 4—4 of FIG. 3.

FIGS. 3 and 4 illustrate an inner member 30 comprising a central disc 31 surrounding an axle or hub opening 32, and an assembly ring 33 which fits into the annular area 34 of the disc portion 31. The assembly ring 33 is fastened to the area 34 by a bolt or screw 35 after the outer member 20 has been assembled therewith. A plurality of pins 36, equal in number and spacing to the openings 22 in the outer member 20, are mounted in the inner wheel circumferential area for extending through an opening 22 and bearing on the sleeve portion 24 of the liners in said openings 22 when they reach certain positions in the wheel rotation. As stated with reference to the openings 22, the number of pins 36 and corresponding openings 22 may be varied, but a larger number is preferred. Pins 36 and openings 22 interact to serve as, at different locations, both the radial force support means and the releasable locking means.

Figure 5:
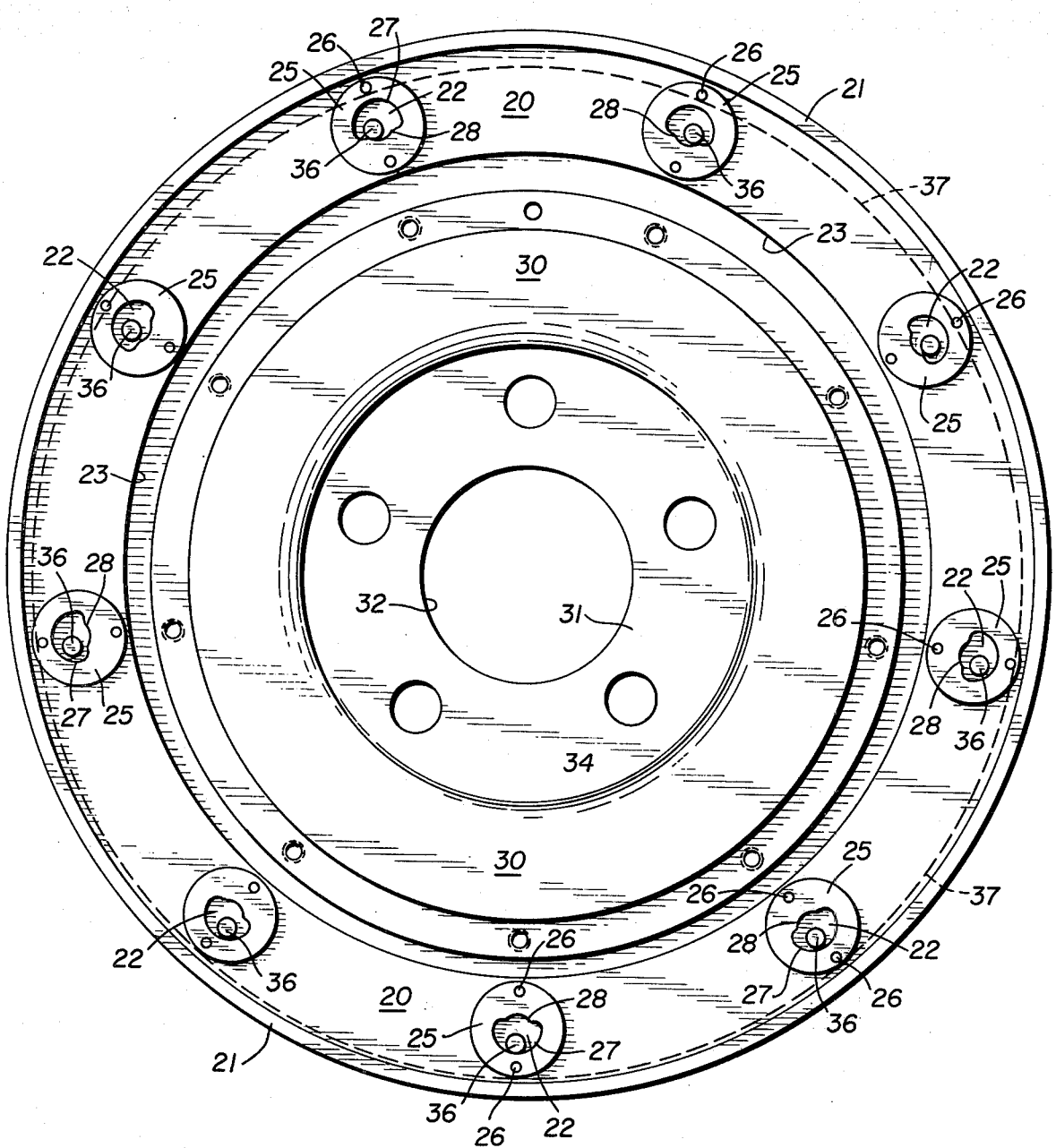
FIG. 5 is an elevational view of the assembled inner and outer members, with the pins of the inner member shown in section.
Figure 6:
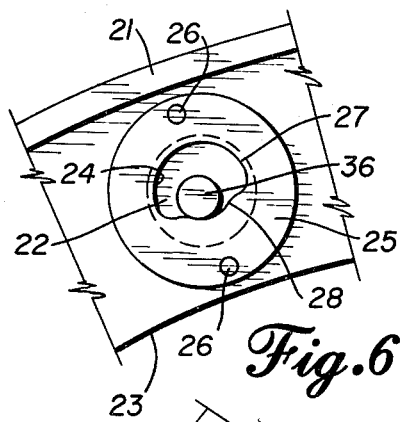
FIGS. 6 through 10 are enlarged fragmentary views showing the relationship of the pin and opening of FIG. 5 in various positions including the topmost, the bottom and the three intermediate positions.

In FIG. 5, the outer member 20 is shown superimposed on the annular area 34 of the inner member 30, with the pins 36 of the inner member 30 extending through openings 22. The inner member 30 receives a load, such as a vehicle weight, through an axle (not shown) in opening 32, causing the lowermost pin 36 bear on the semi-circular portion 27 of sleeve 24 lining the openings 22, and at this location, pin 36 and semi-circular portion 27 together function as the radial force support means. This is more clearly shown in the enlarged view of FIG. 10, where the pin 36 is in the position it assumes under load on the inner wheel when the pin 36 is in a plane perpendicular to the horizon. At the same time, two of the pins 36, at the top of the inner wheel, spaced 20 degrees from opposite sides of the perpendicular plane coinciding with the lowermost of pin 36, each bear on the program bearing surface 28 of an opening 22. The pin 36 and its opening 22 located to the left of the top of the wheel of FIG. 5 are shown in FIG. 6 in the "locked mode" and, at the location, serve as the releasable locking means.

Figure 7:
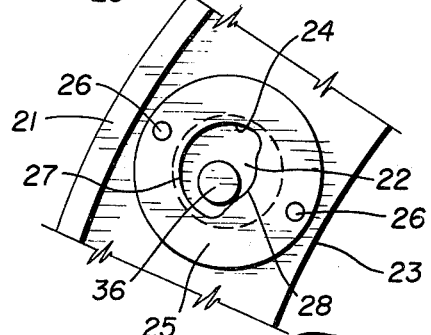
Figure 8:
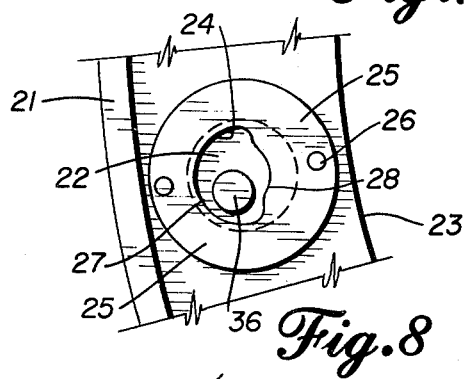
Figure 9:
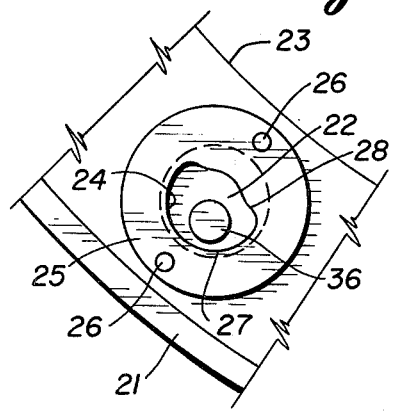
Figure 10:
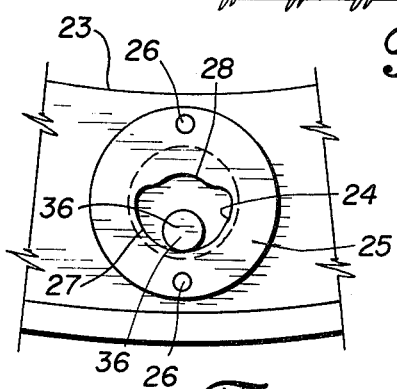
Figure 11:
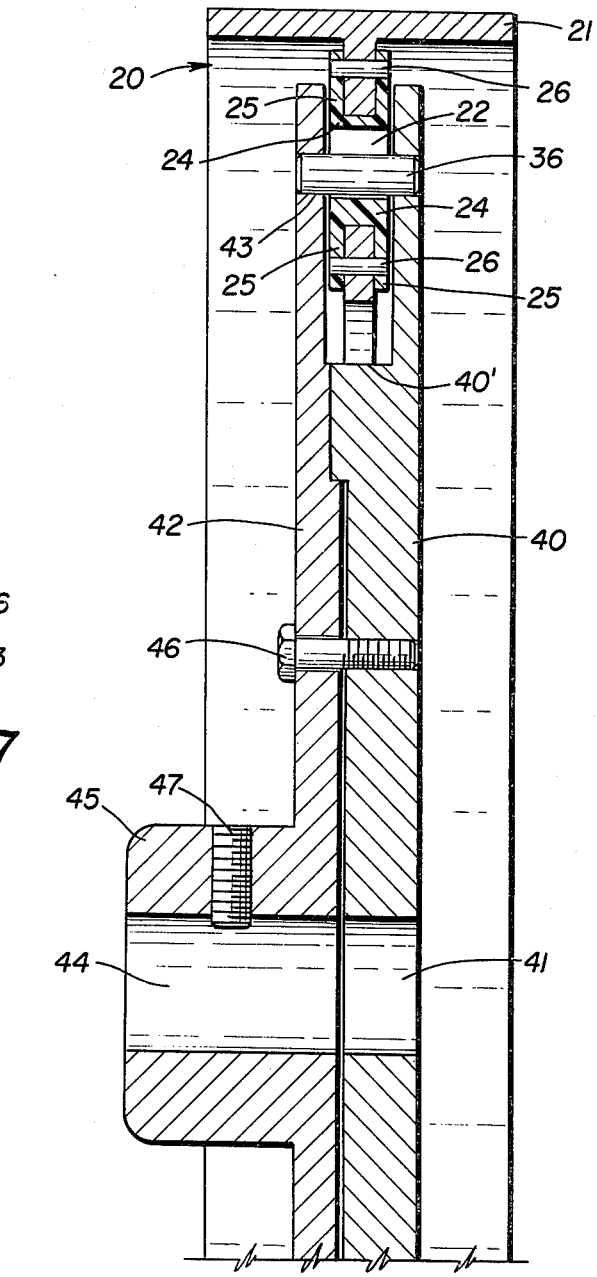
FIG. 11 is a sectional view of a modified embodiment of the instant invention.
Figure 15:
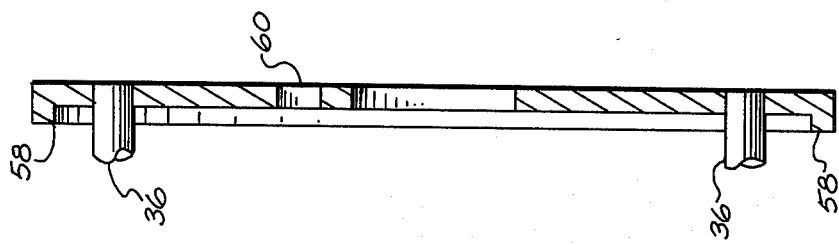
FIG. 15 is a sectional side view in the plane of line 15—15 of the element shown in FIG. 14.
Figure 14:
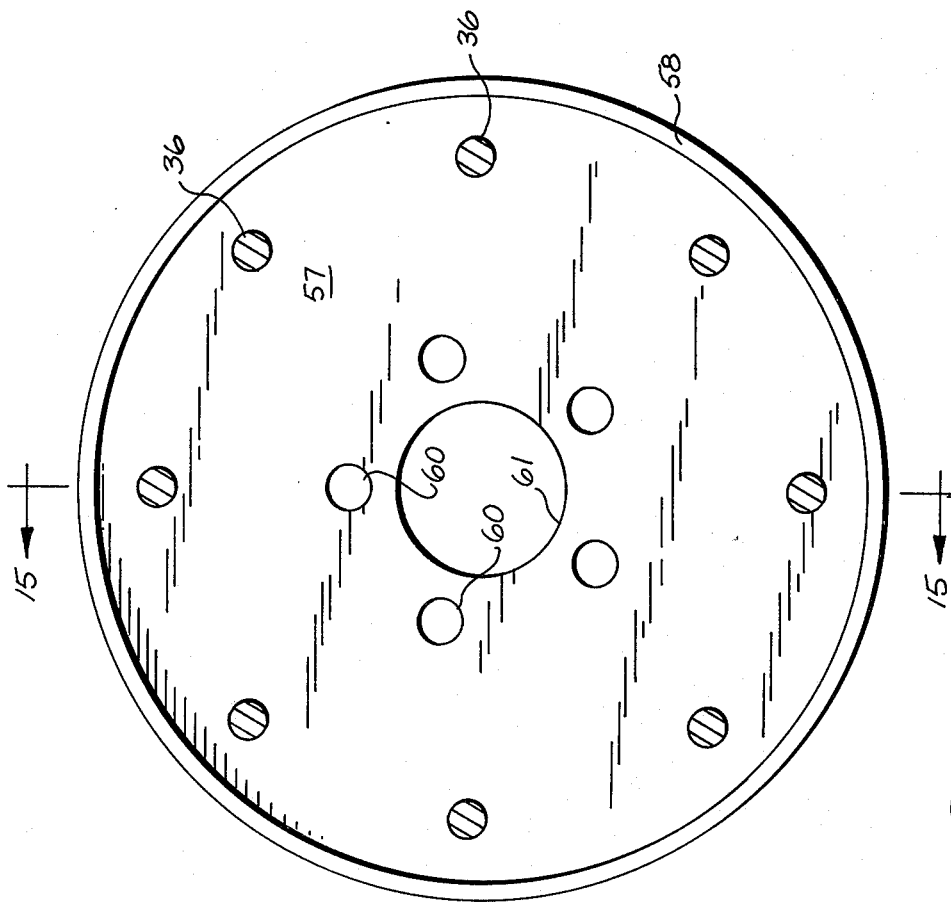
FIG. 14 is an elevational view of a portion of an inner member adapted to cooperate with the outer member shown in FIG. 13.
Figure 17:
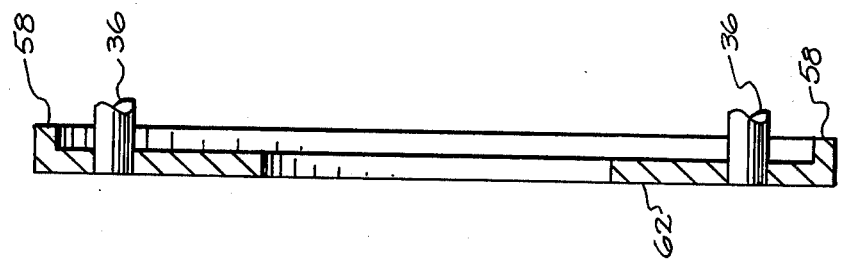
FIG. 17 is a sectional side view in the plane of line 17—17 of the element shown in FIG. 16.
Figure 16:
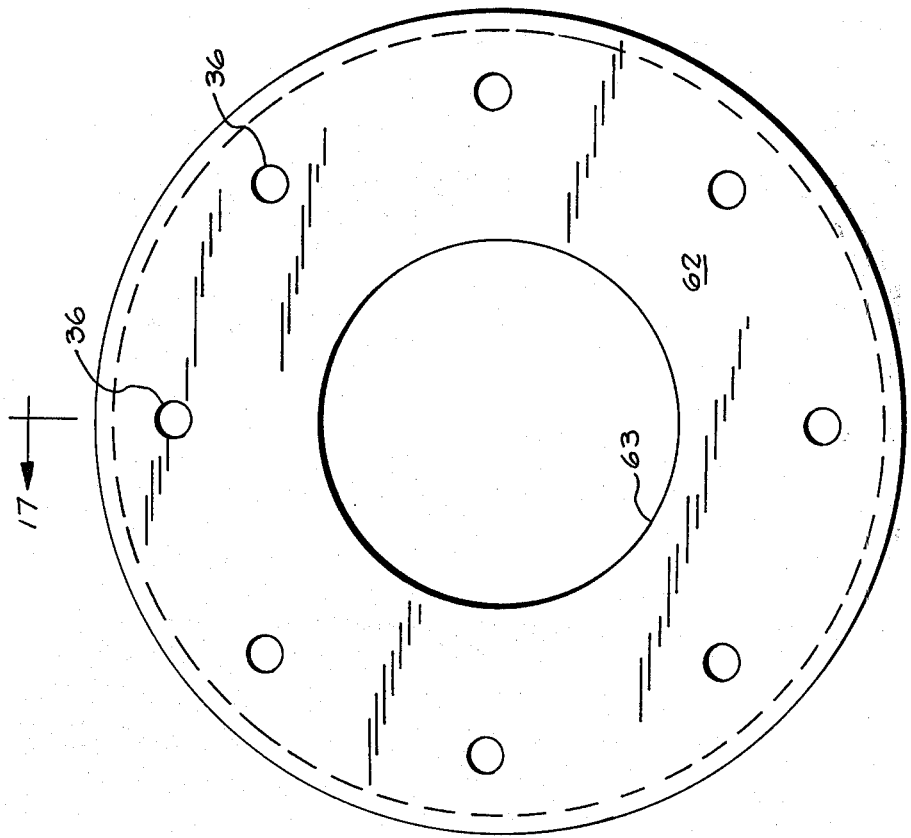
FIG. 16 is an elevational view of the other portion of the inner member adapted to cooperate with the outer member shown in FIG. 14.

FIGS. 7, 8 and 9 show the pins 36 in their respective openings 22 and spaced from the lined surfaces defining the openings 22. These are the positions assumed by pins 36 located at the left side of FIG. 5 between the top pin 36 and the lowermost pin 36 heretofore described in the load-bearing positions as shown in FIGS. 6 and 10. At all times when the inner member 30 is under axle load during the rotation of the assembly, the two top pins 36 bear on the program surfaces 28 of openings 22 while the lowermost pin 36 bears on the semicircular surface 27 on an opening 22 thereby producing the distinct releasable locking means and radial force support means, respectively. The remaining pins 36 at each side of the inner member 30 between the top and bottom pins 36 are out of contact with the edges of openings 22. The weight of the axle, when a torque is applied, is partially on one or more pins 36 towards the bottom of the assembly, and on two pins 36 towards the top of the assembly, with the upper pins 36 responding to the application of torque, as explained. As the inner member 30 turns, it must follow the said program surface 28 in the leading bushing. In order to move 40°, it must transfer the load over the reference surface of the programmer, and since that would require the lowermost pin to move away from the semi-circular bearing surface of its opening 22, which it cannot do unless the load of the axle is overcome by the torque, it merely increases the velocity of the outer member 20 and slows down the inner member 30. The duration of each pulse is from 20° to 60° in either direction. Each of the ine pins 36, in turn, occupies the lowermost bearing position to serve as the radial force support means, and each, in turn, occupies first one and then the other of the two top bearing positions, thereby serving as the releasable locking means and causing the powered inner member 30 to impart translatory motion to the outer member 20 as successive pins 36 of the inner member 30 occupy the bearing positions described.

As heretofore explained, the inner member 30 may be constructed to comprise a single disc with a bifurcated circumferential area designed to provide space for the flat ring outer wheel as shown in the sectional view of FIG. 4. As a modification, the inner member may be made of two separate discs connected together after the outer member 20 has been placed between the discs, as shown in the sectional view of FIG. 11. The parts 20-26 of the outer member 20 are the same heretofore described with reference to FIGS. 1 and 5. The modified inner member comprises a disc wheel 40 cut away to provide a space radially outwardly of shoulder 40'. The disc 40 has a central axle opening 41. A number of pins 36 such as described heretofore are mounted in the disc 40. The other disc, designated 42, has a corresponding number of holes 43 to accommodate the pins 36 of the disc 40 after they have passed through openings 22 of the outer member 20. A hub opening 44 in the hub 45 registers with the opening 41 in disc 40. The two discs, 40 and 42, are fastened together by a nut and bolt 46 after the tire member 20 has been assembled between the discs. A set screw 47 mounts the inner wheel 30 on an axle (not shown).

It should be noted that pins 36 are preferably equally radially spaced from the center of the inner member 30; likewise the centers of the openings 22 are equally radially spaced from the center of the outer member 20; but, when the two wheels are assembled as shown in FIG. 5, with the pins 36 in the openings 22, the vehicle load is imposed on the inner member 30, the centers of the two wheels do not coincide. Alternatively, the pins 36 and openings 22 could be nonconcentrically arranged on and in inner member 30 and outer member 20, respectively. In the preferred embodiment, a full-sized automobile wheel would, for instance, have the center of the inner member approximately one-quarter inch or less below the center of the outer member 20, as a function of the relative cross-sectional dimensions of the pins 36 and the area of the opening 22 within the surfaces of the linear sleeve 24. In the embodiment shown, the said openings 22 in the outer member 20 are approximately twice as wide and twice as long as the diameter of the pins. The imposition of the vehicle weight on the two top pins 36 and the bottom-center pin 36, when the troque is applied, causes the rotated inner wheel to transmit movement to the relatively movable outer member 20 through engagement between the top pins 36 with the program bearing surface 28 of the openings 22 in the outer member 20 during each pulse of the assembly, while the bottom-center pin 36 is in its opening 22 resists motion, thus imparting what may be described as a low frictionless rolling motion of the outer member 20 on its supporting surface. In such rolling motion of the wheel embodying this invention, the length of the torque arm approaches the diameter of the assembly instead of the radius of the conventional wheel. When the assembled wheel is functioning to turn a pulley or to propel a vehicle, such as, for example, a motor drive automobile or a pedalled bicycle, the application of the power to the inner member 30 is transmitted smoothly in successive and preferably overlapping pulses through releasable locking means between the inner and outer members, as the locking means move to the designated portion of the assembly in the continuous rotation of the inner member 30, thereby applying the power to a low friction part of the outer member 20 to obtain increased velocity. The construction converts rotational motion of the inner member 30 to the translatory motion of the entire assembly by transmitting the conventional torque of a wheel to the outer member 20 through the instantaneous center of rotation of the outer member 20 in such a manner that the torque arm of the output is greater than the torque arm of the input, i.e., the torque between the application of the radial force such as contact of a tire with the ground and the application of the torque to the interlocking means is greater than the torque between the center of a conventional wheel and its contact with the ground.

A preferred embodiment of the invention is illustrated in FIGS. 12 through 20 and FIGS. 31 and 32. An outer member generally indicated as 50 is shown in FIGS. 12 and 13. Outer member 50 includes a rim portion 52 secured to the periphery thereof. It is to be understood that, while rim 52 is particularly adapted as shown to mount a pneumatic tire, a solid rubber tire or the V-groove of a pulley, could be similarly disposed as is rim 52 as appropriate for the desired purpose. A number of openings 53, which are annular in configuration and concentrically positioned around the center of outer member 50, are provided to serve the same purpose as the programmed and semi-circular surfaces 27. It is to be understood that a programmed configuration can be advantageously employed, but circular openings 53 provide useful, if not optimum, results with the utmost simplicity. A portion of outer member 50 between openings 53 and rim 52 is narrowed to provide concentric shoulders 55 on both major surfaces of outer member 50.

The inner member is comprised of two dissimilar but complementary circular discs, as shown in FIGS. 14 through 17, which are joined by pins 36. Outside disc 57 is circular in configuration and includes inwardly-directed projection 58 at the rim portion thereof. Holes 60 are provided in a configuration such as to accept lug bolts on an axle hub (not shown). An opening 61 is defined in outer disc 57 to permit passage of an axle therethrough.

Inner disc 62 is similar to outer disc 57 except for a larger opening 63 at the center portion thereof to permit an axle (not shown) and hub assembly to pass therethrough. Pins 36 and projection 58 of inner disc 62 are essentially the same as those of outer disc 57 except for an opposite orientaion.

Figure 19:
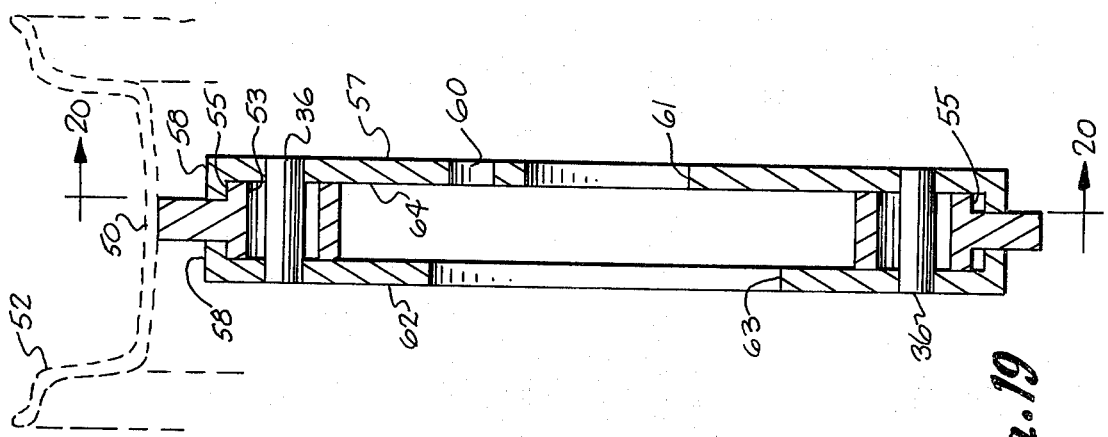
FIG. 19 is a sectional view in the plane of line 19—19 of the assembly as shown in FIG. 18.
Figure 18:
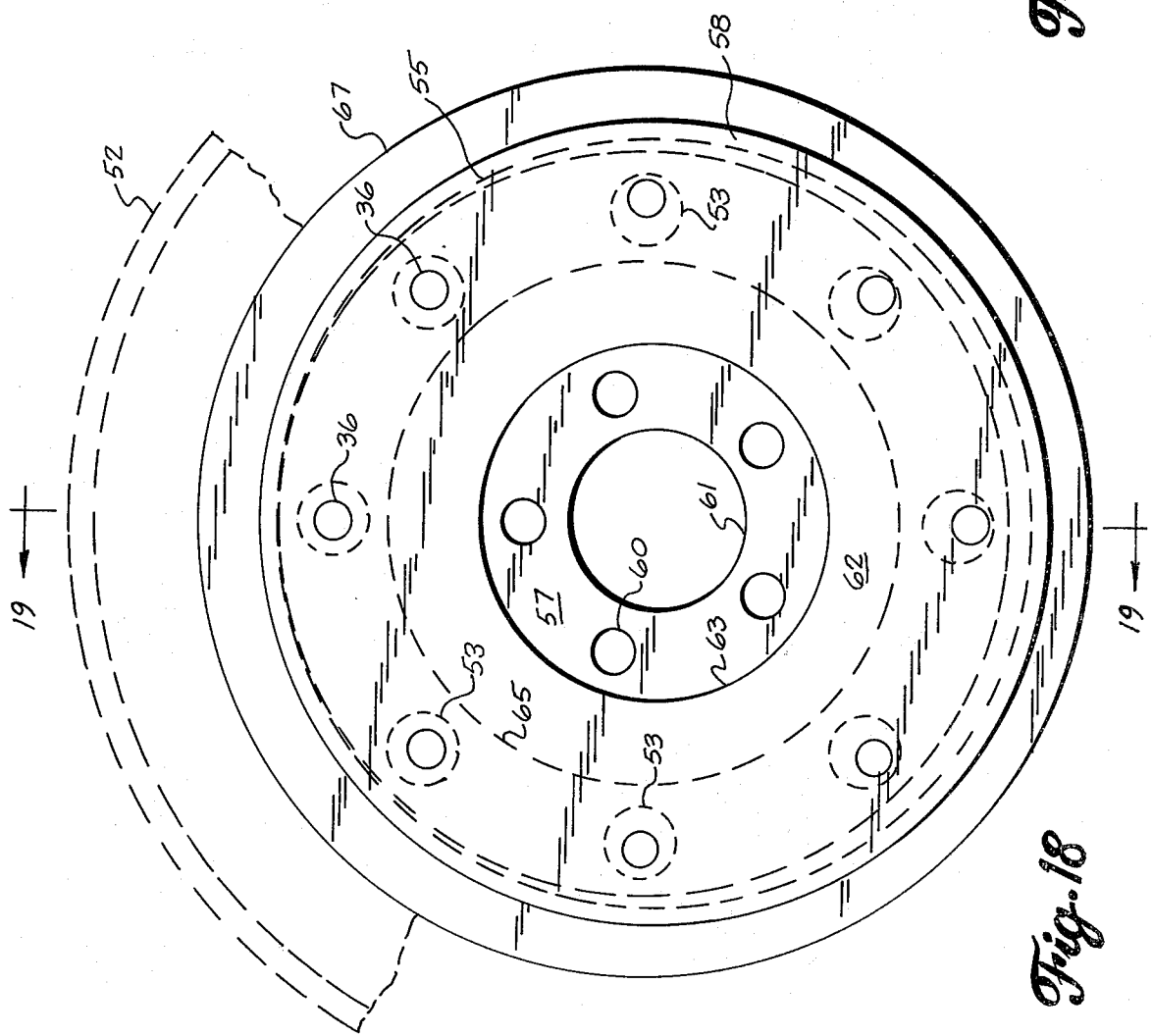
FIG. 18 is a view of the assembled inner and outer members illustrated in FIGS. 12, 13, 14, 15, 16 and 17.

Outer member 50 and inner and outer discs 62 and 57, respectively, are assembled as shown in FIGS. 18 and 19 to produce a completed apparatus according to the instant invention. With particular reference to FIG. 19, it will be noted that outer disc 57 and inner disc 62 are joined together by, for instance, and interference fit of pins 36 into outer disc 57 and inner disc 62. Accordingly, outer disc 57 and inner disc 62 are formed into an integral unit which function as the inner member 64 of the device according to the instant invention. Shoulder 55 on outer member 50 supports projections 58. Because the diameter of annular projections 58 is greater than the diameter of annular shoulders 55, it will be seen that the inner member 64, when supported as it will be at the upper portion of outer member 509 by shoulders 55, has a center somewhat lower than that of outer member 50. Accordingly, in the instant embodiment, pins 36 do not serve as radial support means but, instead, the interface between shoulders 55 of outer member 50 and projections 58 of the inner member 64 serves this purpose. Pins 36 fit freely into openings 53 when the assemblage is in a static position, i.e., with no torque being applied to the members and the load is borne by shoulders 55 and projections 58. However, when a torque is applied between the inner and outer members 64 and 50, the interface between shoulders 55 and projections 58, having essentially no resistance to shear forces therebetween, permits the inner member 64 to rotate, for instance, as shown in FIG. 20, thereby causing certain of pins 36 to contact and drive against the surfaces of openings 53. When torque is applied to the inner member 64 in a clockwise manner, as shown in FIG. 20, pins 36 in the upper right hand quadrant become the driving pins and the other pins 36 remain essentially free of contact with openings 53. This, in effect, transfers the torque applied to the center of inner member 64 to outer member 50 at the point of contact between openings 53 and pins 36 shown. Thus, though in a more simplified and stable manner, the embodiments of FIGS. 12 through 20 and FIGS. 31 and 32 provide a result essentially the same as that of FIGS. 1 through 11, i.e., the application of a force to provide a torque arm around an instantaneous center on the outer member which is more favorable and advantageous than the conventional torque arm between the center of the axle and the periphery of the outer member.

Figure 31:
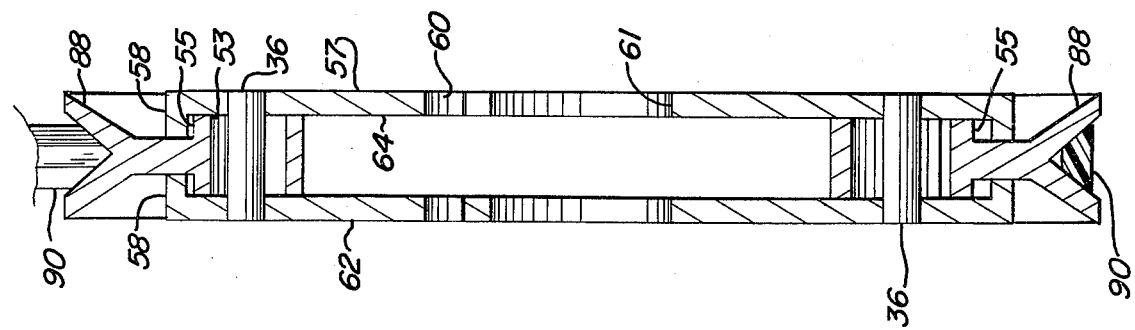
FIG. 31 is a sectioned view of an embodiment of the invention similar to that of FIG. 19 including a pulley groove and belt.
Figure 32:
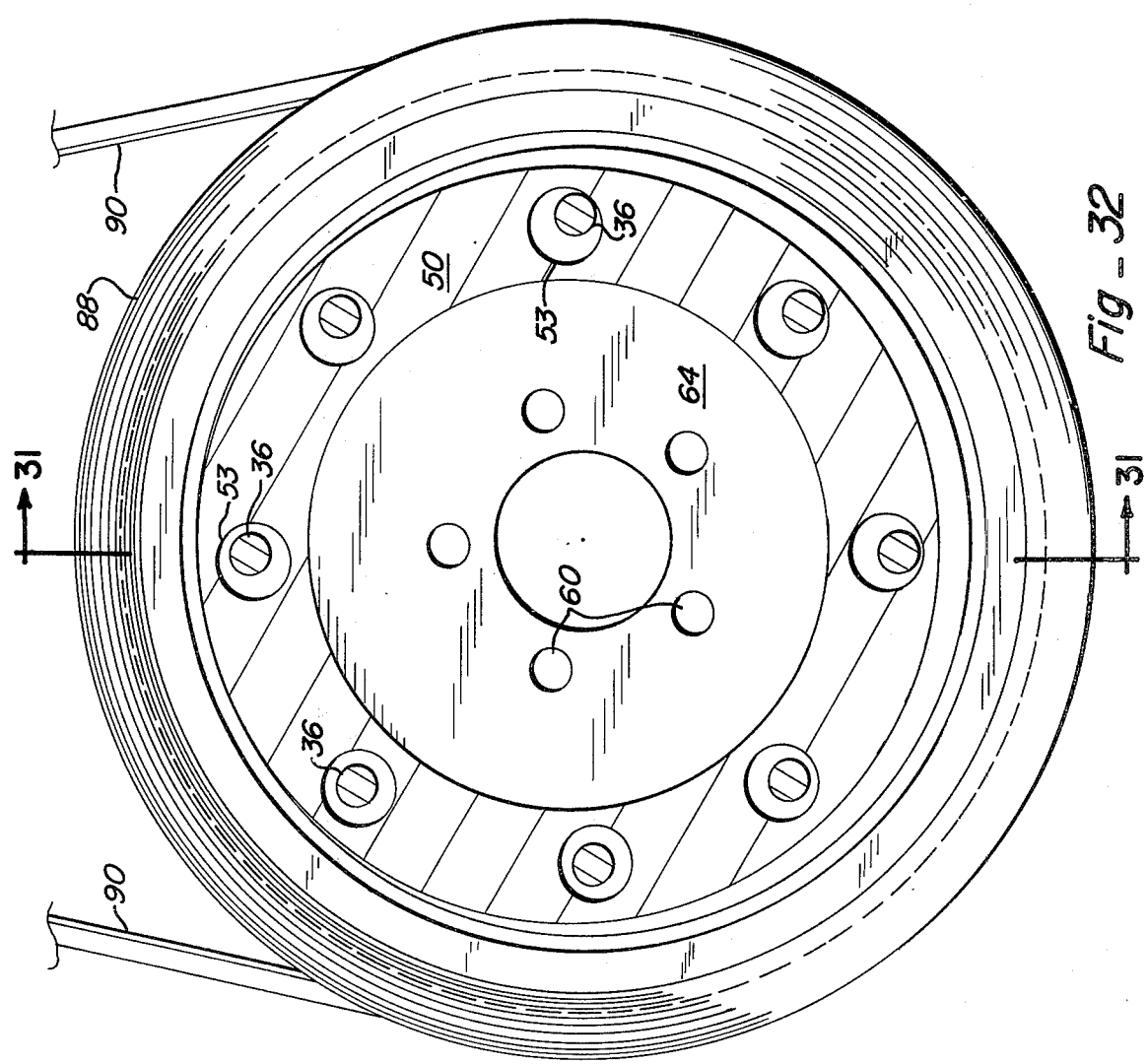
FIG. 32 is an elevational view with the center portion sectioned of the embodiment of FIG. 31.

FIGS. 31 and 32 illustrate another means by which tension may be applied to outer member 50. For instance, the periphery of outer member 50 may be in the form of a pulley 88 having therein a belt 90. Accordingly, tension on belt 90 will bias outer member 50 such that shoulders 55 on outer member 50 rest on projection 58 of inner member 64. Thus it will be seen that the operation of the embodiment of FIGS. 31 and 32 is essentially the same as that described above with regard to FIGS. 18, 19 and 20.

A particularly compact application of the invention for use on a conventional rim of, for example, a bicycle or motorcycle is illustrated in FIGS. 21 through 26. An outer wheel member 65 is illustrated in FIGS. 21 and 22. Outer wheel member 65 corresponds quite closely to outer member 50 of FIGS. 12 and 13. Shoulders 55 and openings 53 are functionally equivalent to the same members in outer member 50 of FIGS. 12 and 13. However, a tire member 67, which is shown as being solid, is positioned on the periphery of outer wheel member 65.

Figure 24:
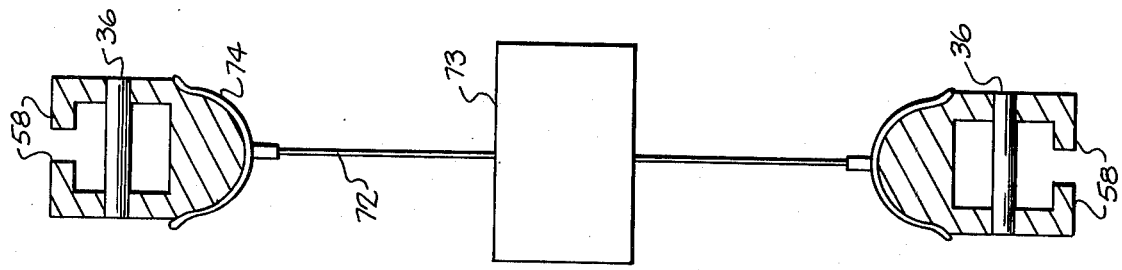
FIG. 24 is a sectional side view in the plane of line 24—24 of the inner member shown in FIG. 23.
Figure 23:
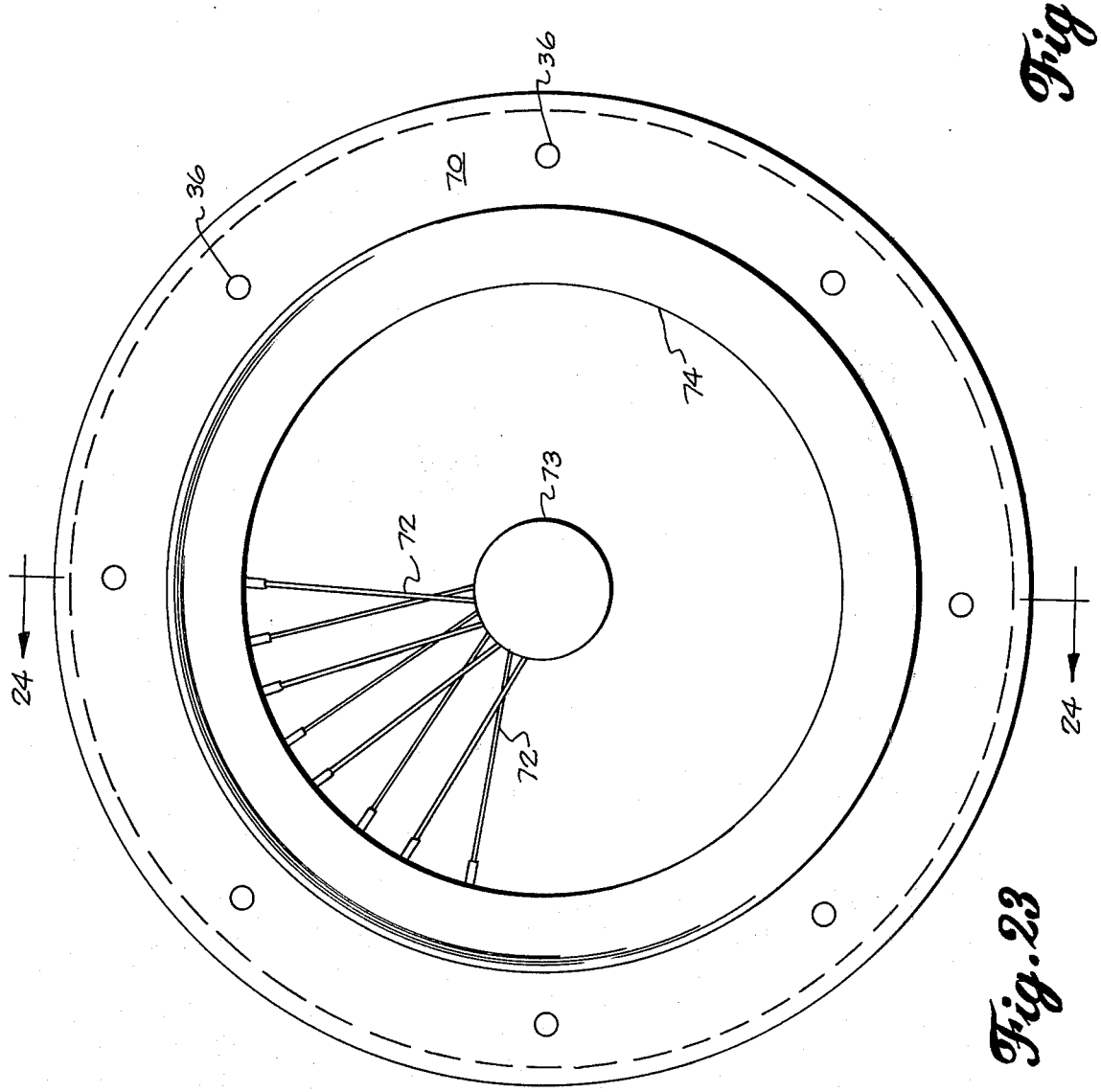
FIG. 23 is an elevational view of an inner member according to the instant invention which is adapted for use on a bicycle.

FIGS. 23 and 24 illustrate an inner rim member 70 which, in function, closely correlates with inner member 64 as shown in FIGS. 18 and 19. Inner rim member 70 comprises spokes 72 joining rim 74 and hub 73. Rim 74 which may be, for instance, a conventional bicycle rim or which may be integral with body portion 75, includes the unique construction of the instant invention including pins 36 and projections 58.

Figure 26:
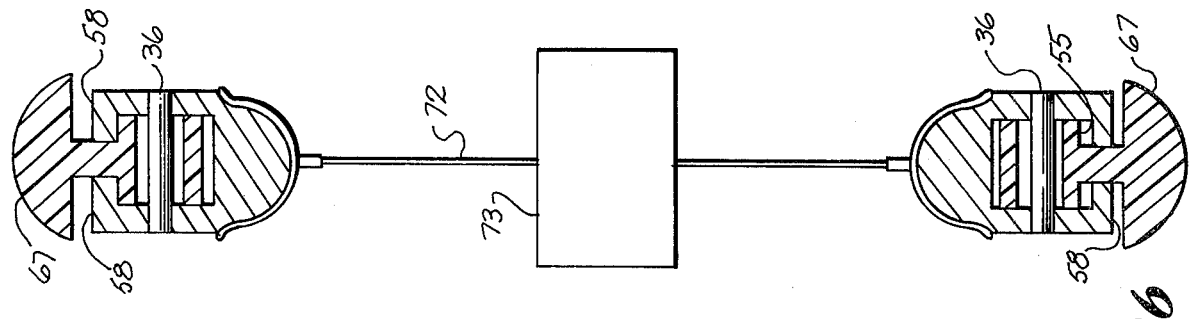
FIG. 26 is a sectional side view in the plane of line 26—26 of the assemblage shown in FIG. 25.
Figure 25:
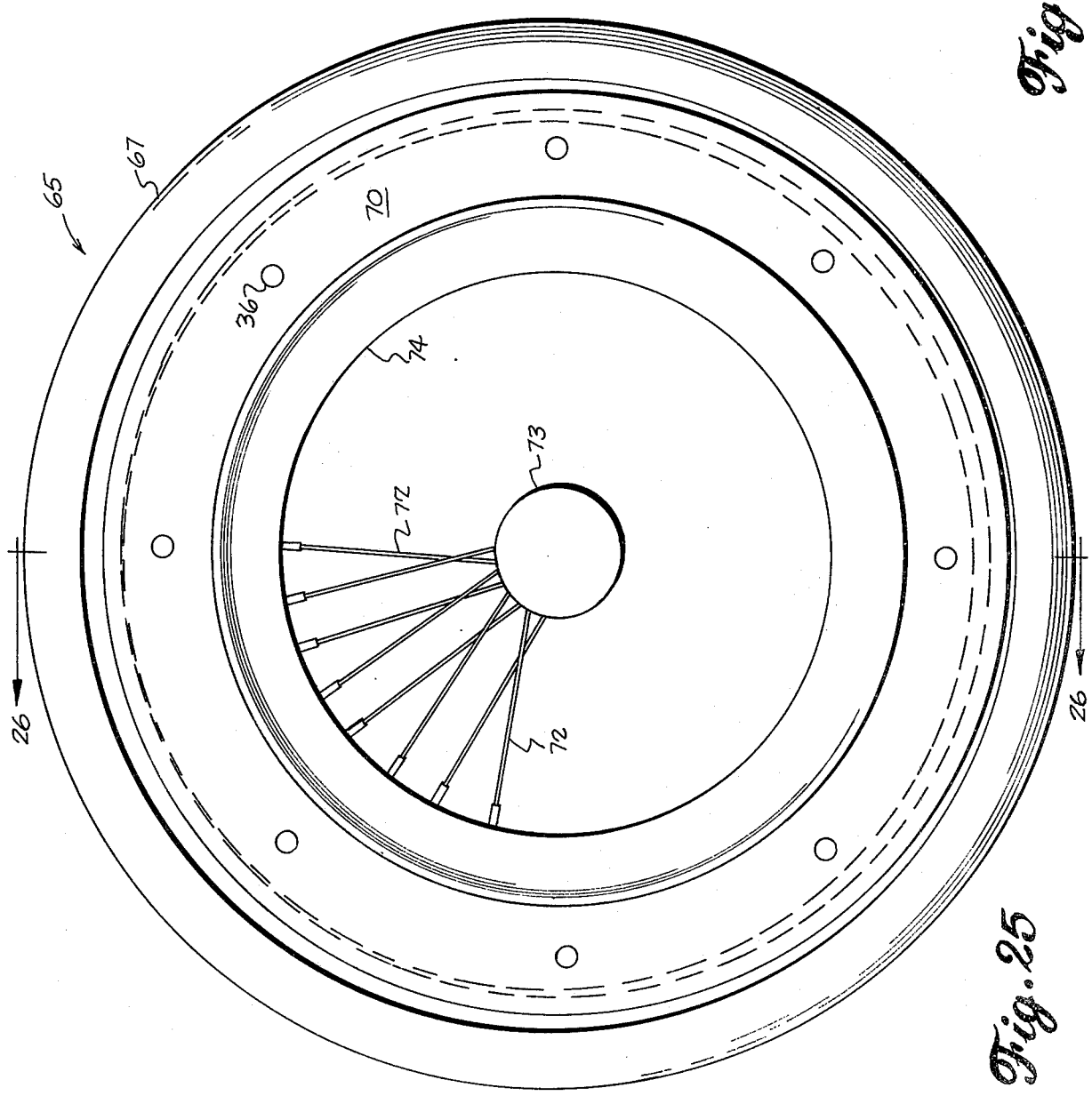
FIG. 25 is an elevational view of the inner and outer members of FIGS. 21, 22, 23 and 24 assembled according to the instant invention.

The relationship between outer wheel member 65 and inner rim member 70 is shown in FIGS. 25 and 26, from which it will be noted that inner rim member 70 is, in effect, suspended from outer wheel member 65 by means of projections 58 bearing upon shoulders 55. Again, because of the difference in diameters of annular projections 58, and the smaller diameter annular shoulders 55, outer wheel member 65 is maintained in an eccentric relationship to inner rim member 70 with the center of inner rim member 70, in a static condition, being somewhat lower. It will be understood that the illustration enlarges the relationship between the parts for purposes of clarity, but that, in fact, the portion between rim 74 and tire member 67 would, in fact, be most compact and little different from the volume occupied by the ordinary pneumatic tire. When torque is applied to inner rim member 70, the advantageous transfer of force between pins 36 and holes 53 would be as described above.

Figure 27:
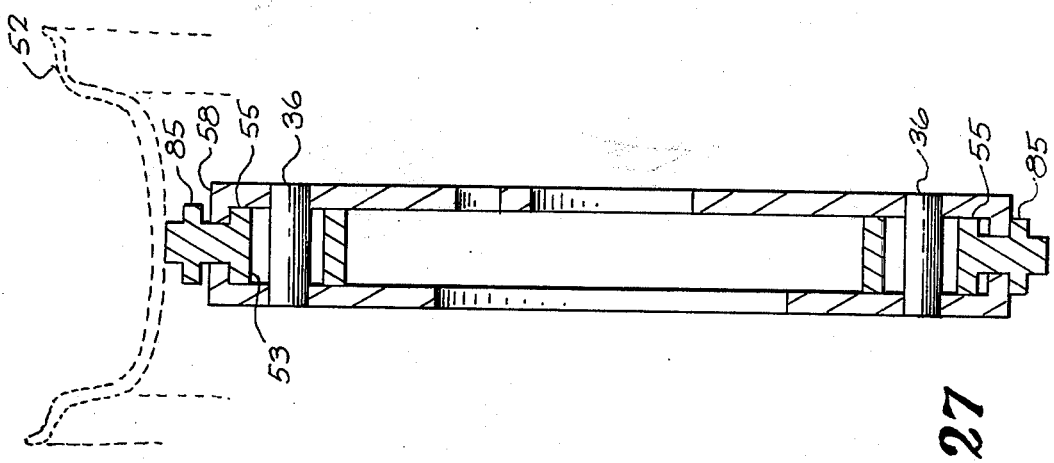
FIG. 27 is a sectional side view of the preferred embodiment of the instant invention which constitutes an improvement upon the embodiment illustrated in FIGS. 12 through 20.

FIG. 27 illustrates a particularly preferred embodiment of the instant invention. This embodiment is an improvement upon the embodiment illustrated in FIGS. 18 and 19. The embodiment illustrated in FIG. 27 is essentially identical to that illustrated in FIG. 19, i.e., with regard to pins 36, rim section 52, openings 53, shoulders 55, projections 58, and other such features. However, a second shoulder 82, concentric with shoulder 55 but of a larger diameter, is provided. Accordingly, projection 58 is supported by shoulders 55 at the upper portion of the assembly, as illustrated in FIGS. 18 and 19, but the outer surface of projection 58 also rides upon second shoulder 82 at the lower portion as a result of the displacement of inner member 64 downward in the static mode. By supporting inner member 64 and outer member 50 at two positions, the stability of the assembly is enhanced in that any pendulum effect or acceleration resulting from sole support at the upper portion of the assembly is obviated.

Figure 28:
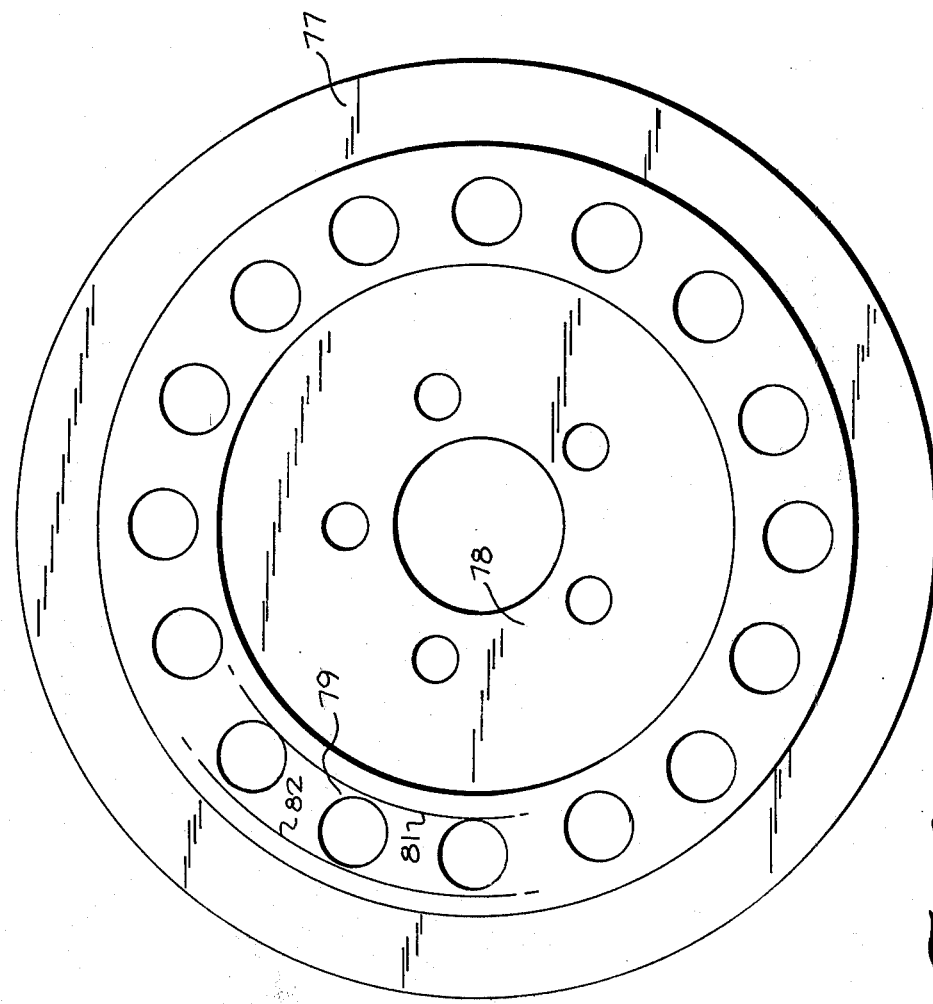
FIG. 28 is an elevational view of another embodiment of the instant invention.

FIG. 28 illustrates an embodiment of the instant invention which emphasizes the variety of means which may be employed to accomplish the relationship of the instant invention. Specifically, a larger member 77, which, as illustrated, is essentially a wheel or tire member, for contact with the ground, or a pulley V, and which corresponds, for instance, to outer wheel member 65 of the preceding figures, is disposed around a smaller member 78 which is basically configured as inner member 64, except for the support and locking means. Between larger member 77 and smaller member 78, and attached securely to each, is a resilient section 79, having a plurality of preferably evenly-spaced voids 80 defined therein. Accordingly, when a load is imposed in a radial direction upon smaller member 78, resilient section 79, and particularly voids 80, compress thereby permitting smaller member 78 to assume an eccentric relationship relative to larger member 77. An outer bearing surface 81 of smaller member 78 would thus contact an inner bearing surface 82 of larger member 77. Clearly, the interface between outer bearing surface 81 and inner bearing surface 82 would readily transmit radial forces but would not transfer torque between smaller member 78 and larger member 77. However, when a torque is applied between smaller member 78 and larger member 77, smaller member 78 would move in the direction of travel that the torque tends to impart and assumes, through the distending of resilient section 79, the above-discussed advantageous relationship. Particularly the portions of resilient section 79 between voids 80 tend to, in tension, function as the interlocking means in the appropriate upper "forward" quadrant with respect to the direction of acceleration imparted by the applied torque. The displacement of smaller member 78 within larger member 77 by the radial force places an initial tension in the proper "locking" positions of resilient section 79 for proper locking. Since rather substantial deformation of resilient section 79 is required, this configuraton is readily distinquished from constructions where a layer of rubber or other dampening material is provided between two concentric circular members, i.e., rubber-mounted railroad wheels or roller skates. In these latter cases, only the dampening or sound-deadening function is desired and deformation of the rubber is precluded or drastically minimized.

FIGS. 29 and 30 schematically illustrate the static and dynamic relationship between the inner and outer members of the instant invention. As shown in FIG. 29, an outer member 50 supports an inner member 64 comprised of, for instance, inner and outer discs 62 and 57, as shown in FIG. 27. Radial force applied as illustrated at vector A′, and the composite opposite reaction as shown by vectors A, is supported at an interface between the inner and outer members, such as shoulders 55 and 85 and projection 58 as discussed with regard to FIG. 27. Accordingly, pin 36 is disposed in an essentially non-force transmitting relationship to opening 53.

However, when a torque is applied to the inner member, which carries pins 36, pin 36 contacts the wall of opening 53, as shown in FIG. 30, and also changes the relationship between the non-concentrically disposed inner and outer members and produces force C between shoulders 55 or 85 and projection 58. Accordingly, a force is transferred from pin 35 to the wall of opening 53 as shown by vector B. This results in a force couple whereby the force represented by vector A′, i.e., contact with a supporting surface, serves as an instantaneous center around which the outer member will rotate in response to the force represented by vector B. Since vector B is not directly opposite vector A′, as is vector A, there is less of a compression between the two forces at the interface between the outer member and a supporting surface. Accordingly, rolling friction and sliding friction are reduced. Further, since the torque arm, or force couple, between vector A′ and vector B is of more advantageous configuration both as to length and direction, there is a greatly reduced tendency for the outer member to slide, skid or scrub on the supporting surface when a torque is applied to the inner member. It is to be understood, of course, that the relationship shown in FIG. 30 is instantaneously correct, though the overall relationship is constant in a relative, though not absolute, sense with reference to the supporting surface and specific location on the wheel.

Summarily, several differing embodiments of the basic and broad concept of the instant invention have been illustrated and described. Quite simply, the instant invention is concerned with a device and method for applying torque not through the conventional torque arm between the center and periphery of the wheel, but by generating and applying a force offset from the center of the wheel and preferably in an upper quadrant of the wheel near the periphery. This results in an elongated torque arm between the contact between the wheel and a supporting surface, the supporting surface being a broad concept including, for instance, the force generated by a pulley in a V-belt, and provides an improved torque amplification and application utilizing the contact between the supporting surface and the wheel as in instantaneous center of rotation.

While myriad mechanical expedients may be employed to achieve the concept of the instant invention, the basic factors are simple and concise. Two members are loosely secured together, one within the other. A radial force thus will initially produce a displacement constant in direction relative to the radial force. As a result of such displacement, the members can be sequentially interlocked for transmission of torque therebetween at a position substantially constant relative to the position at which the radial force is applied. This produces the advantageous force couple between the instantaneous interlocking position and the instantaneous position at which the radial force is applied.

Put even more simply, the radial force, which corresponds to the weight of a vehicle between the tire and the ground, or the tension along a pulley belt, establishes a first reference point. Displacement between the two members largely resulting from the radial force is utilized to selectively engage the sequential interlocking between the two members for transmission of torque. When torque is applied, the displacement will vary but will be substantially influenced by the radial force, and, accordingly, the point of interlocking will be primarily controlled by the radial force.

Of course, many optimizing features may be employed in a concept as unique as that of the instant invention. For instance, as discussed above, the interlocking means may be pins and openings, and either or both of the pins and openings may be "programmed" to more closely control the position of the interlocking of the inner and outer members. Taken further, when one or both of the pins and openings are circular in configuration, the circular surface may be journaled on such as roller bearings to avoid scuffling between the two surfaces. Other such optimizing expedients will, of course, be apparent to those skilled in the art once the concept of the instant invention is drafted.

From another viewpoint, the two members need not be circular. Just as elliptical gears and square wheels function after a fashion, so can the instant invention. However, circular members are much preferred over other configurations.

Although only several of the numerous possible embodiments of the present invention have been illustrated and described, it is anticipated that various changes and modifications will be readily apparent to those skilled in the art and such changes may be made without departing from the scope of the invention, as defined by the following claims.

What is claimed is:

1. A method of advantageously utilizing torque, comprising: applying a relative torque between an inner member and an outer member, applying a radial force component to the outer member radially, displacing the inner member within the outer member, selectively and sequentially interlocking the inner member and the outer member at positions remote from the centers of the members but at a substantially constant position relative to that at which the radial force is applied to the outer member, and accordingly forming a force couple between the instantaneous location at which the radial force is applied to the outer member and the instantaneous location at which force is transmitted through the interlock between the inner member and the outer member, whereby a rotary motion is imparted to the assembly by the force couple.

2. A method of utilizing torque as set forth in claim 1 wherein the inner member and the outer member are both substantially circular in configuration, and wherein the radial force is transmitted between the inner member and the outer member by an interface which is of a low-friction nature in the shear mode and, accordingly, will not transmit substantial torque between the inner member and the outer member.

3. A method of utilizing torque as set forth in claim 2 wherein the circular inner member and outer member are adapted for use on a vehicle with a tire comprising the periphery of the outer member, the radial force is generated by vehicle weight imposed upon the circular inner and outer members, and the torque is generated by braking and driving forces applied to the circular inner and outer members.

4. A method of utilizing torque as set forth in claim 2 wherein the circular inner and outer members are in the form of a pulley with the periphery of the outer member adapted to receive a belt, the radial force is generated by the tension of the belt bearing upon the pulley, and the torque is generated by an unbalanced tension along the belt.

5. A method of utilizing torque as set forth in claim 2 wherein the selective and sequential interlock is accomplished by interference between pins and holes, the pins being attached to one of the member and the holes being defined in the other member, the interference being selective as a result of an eccentricity between the configuration of the pins and the configuration of the holes and as a result of the application of the radial force between the inner member and the outer member with the resulting displacement between the inner member and the outer member.

6. A method of utilizing torque as set forth in claim 5 wherein at least one of the surfaces of the pins and the surfaces of the holes is of a non-circular, cross-sectioned configuration to provide interference in a programmed manner.

7. A method of utilizing torque as set forth in claim 2 wherein the interface connecting the inner and the outer members is a resilient interface which distends to function as the interlock when torque is applied.

8. A method of operating a wheel assembly for a vehicle having a vehicle weight, comprising: imposing a portion of the vehicle weight on an inner member of the wheel assembly, transferring the vehicle weight from the inner member of the wheel assembly to an outer member of the wheel assembly having a tire at the periphery thereof, and supported by a surface bearing the vehicle, the vehicle weight being transferred between an interface between the inner member and the outer member with the interface being such that only substantially radial forces may be transferred between the inner member and the outer member at such interface, interlocking the inner member and the outer member at a position remote from a line extending from the contact point of the outer member with the supporting surface and through the center of the inner member, the position of the interlock being substantially constant relative to the position at which the outer member bears against the supporting surface at any time and with any given torque, and applying a torque between the inner member and the outer member whereby the torque produces a force at the interlocked position which force constitutes one portion of a force couple, the other portion being the force applied to the outer member at the point of contact with the supporting surface, such force couple tending to rotate the wheel assembly in an advantageous manner.

9. A method of operating a wheel assembly as set forth in claim 8 wherein the inner member and outer member are interlocked by means of pins extending axially from one member through holes defined in the other member.

10. A method of operating a wheel assembly as set forth in claim 8 wherein the interlock between the inner member and the outer member is produced by a resilient connection between the inner member and the outer member.

11. A method of operating a pulley assembly, comprising: inducing a radial force component on an outer circular member of the assembly by means of a belt bearing upon the periphery of the outer member, transferring the force from the belt radially to an inner circular member movably disposed substantially within the outer member through an interface which will transmit only substantially radial forces to displace the inner member within the outer member, interlocking the inner member and outer member at a position removed from a line through the direction of the radial force bearing upon the outer member from the belt as a function of the displacement, inducing a torque between the inner member and the outer member to produce a force at the interlock between the inner member and the outer member, and maintaining the relationship between the interlock position and the position at which the radial force is applied to the periphery of the pulley when the pulley assembly is rotated.

12. Apparatus for advantageously utilizing torque, comprising: an outer member, an inner member disposed substantially within the outer member and secured therein to permit substantial radial movement between the inner member and the outer member, first means to transmit radial forces between the inner member and the outer member, and second means to selectively and sequentially interlock the inner member and the outer member together at positions substantially constant relative to a position at which an external radial force may be applied to the outer member to preclude appreciable rotation therebetween, whereby an advantageous force couple may be produced between a force applied to the outer member at the second means as a result of a torque between the inner member and the outer member, and an external radial force applied to the outer member, which force couple tends to rotate the apparatus.

13. Apparatus for utilizing torque as set forth in claim 12 wherein the inner member and the outer member are each circular in configuration, and the first means comprise at least one surface on the inner member of a substantially circular arrangement and at least one surface on the outer member of a substantially circular arrangement, the surface on the inner member and the surface on the outer member interfacing in such a manner as to provide a low-friction resistance to shear forces between the inner member and the outer member but providing a direct transfer of substantially radial forces between the members.

14. Apparatus for utilizing torque as set forth in claim 13 wherein the first means comprise a plurality of openings defined one member and arranged therein in an evenly-spaced circular configuration, and a plurality of pins protruding from the other member in a configuration complementary to the configuration of the openings, the openings being of a larger diameter than the pins, whereby the pins may move within the openings to permit a limited radial displacement of one member relative to the other member.

15. Apparatus for utilizing torque as set forth in claim 13 wherein at least one annular shoulder is provided on the outer member, at least one annular projection having at least one support surface of a diameter somewhat larger than the diameter of the shoulder is provided on the inner member and the shoulder and projection are in contact, whereby the projection will interface with the shoulder and permit only limited radial movement of one member relative to the other member, but will permit rotation of one member relative to the other member.

16. Apparatus for utilizing torque as set forth in claim 15 wherein a second annular shoulder concentric with the first annular shoulder is provided on the outer member, the second annular shoulder being of a sufficiently larger diameter that the inner surface of the projection interfaces with the first annular shoulder on one side of the apparatus, the outer surface of the projection of the inner member interfaces with the second annular shoulder on the opposite side of the apparatus, whereby the inner and outer members are supported at opposite sides by the first shoulder and the second shoulder contacting opposite sides of the projection.

17. Apparatus for utilizing torque as set forth in claim 13 wherein the first means comprises an annular cavity defined in the outer member, and the periphery of the inner member, such periphery being of a somewhat smaller diameter than the cavity and interfacing with the cavity to transmit radial force but to provide little resistance to rotational forces between the two members.

18. Apparatus for utilizing torque as set forth in claim 12 wherein the second means comprises a series of openings defined in one of the members and arranged in a substantially circular, evenly-spaced pattern, and a series of pins protruding from the other member arranged in a complementary pattern, the pins being of a smaller diameter than the openings, whereby the members may be interlocked by the pins in the openings when a torque is applied therebetween, and sequentially interlocked between only the pins and openings at selected positions when the members are mutually displaced by a radial force.

19. Apparatus for utilizing torque as set forth in claim 18 wherein the openings are of a varying diameter cross-section to program the interlocking of the members.

20. Apparatus for utilizing torque as set forth in claim 18 wherein the pins are of a varying diameter cross-section to program the interlocking of the members.

21. Apparatus for utilizing torque as set forth in claim 18 wherein both the openings and the pins are of a varying diameter cross-section to program the interlocking of the members.

22. Apparatus for utilizing torque as set forth in claim 18 wherein at least one of the pins and the openings are of a circular configuration and journaled for rotation relative to the associated member.

23. Apparatus for utilizing torque as set forth in claim 12 wherein the second means comprises a resilient member connected to both the inner member and the outer member and movably securing the inner member substantially within the outer member, whereby the inner member may be displaced radially relative to the outer member when a radial force is applied therebetween, and torque may be transferred between the members at only limited positions as a function of the radial displacement between the members.

24. Apparatus, comprising: an outer circular member having a plurality of equally-spaced, concentrically patterned openings defined therein spaced from the outer and inner edges of the members, the outer member having defined thereon annular shoulders concentric with the annular openings pattern, and an inner circular member having a plurality of pins axially protruding therefrom and arranged in an annular pattern complementary to the pattern of the openings, the pins being of a diameter less than the diameter of the openings, the inner member also having opposed inwardly and axially oriented projections in the form of annular ring of a diameter larger than the diameter of the shoulders, the inner member being supported by the projections interfacing with the shoulders of the outer ring and the pins being positioned within the openings, whereby the inner member can be displaced by a radial force between the inner and outer members, such displacement being limited by the shoulders and projections, and the pins and openings function as an interlock between the inner and outer members at limited positions remote from and determined by the position at which the radial force is applied to the outer member.

25. Apparatus as set forth in claim 24 wherein the inner member is mounted upon a conventional tire rim.

26. Apparatus as set forth in claim 24 wherein the outer member carries a conventional pneumatic tire rim.

27. Apparatus as set forth in claim 24 wherein the outer member also includes a second annular shoulder projection concentric with the first shoulder and of a larger diameter than the first shoulder, whereby the opposite surface of the projection of the inner member than that which rides on the first shoulder interfaces with the second shoulder when the inner member is fully displaced relative to the outer member.

28. Apparatus as set forth in claim 24 wherein the openings are of a varying diameter in order to further program the interlocking of the pins and openings.

29. Apparatus as set forth in claim 24 wherein the pins are of a varying diameter in order to further program the interlocking of the inner and outer members.

30. Apparatus, comprising: a first member, a second member of a diameter less than that of the first member and secured against axial movement within the diameter of the first member with limited freedom for radial movement, and means responsive to the displacement of the second member radially with respect to the first member to sequentially interlock the first and second member at selected positions as a function of the relative displacement of one member relative to the other member.

31. A wheel assembly, comprising: a ring form outer member provided with concentric annularly located series of equi-arcuately spaced-apart openings, an inner member diametrically smaller than the outer member mounted on means to impart torque to the inner member relative to the outer member, the inner member being provided with a concentrically annularly located series of equi-arcuately spaced pins projecting from one side of the surface, said pins being smaller in diameter than the outer member openings, and means retaining the inner and outer members in side-facing radially movable relationship, with each pin extending into one of said openings, whereby radial loads imposed upon the inner member causes the center of the inner member to be in a horizontal plane below the center of the outer member, and moves a top pin and a bottom pin to radially load-bearing position against the bearing surfaces of the respective openings into which said pins extend, and when torque is applied to the inner member, the dislocation of the inner member within the outer member causes force to be transmitted through the pins interfacing with the respective openings at one or more locations substantially constant relative to the direction of application of the radial force to the inner member.

32. A wheel assembly, comprising: a circular outer member provided with a concentrically annularly located series of equi-arcuately spaced-apart openings, an inner circular member diametrically smaller than the outer member, said inner member being provided with a concentric annularly located series of equi-arcuately spaced-apart pins projecting fron one side surface in an axial direction, said pins being smaller in diameter than the outer member openings, means retaining the inner and outer members in side facing relatively radially movable relationship, with each pin extending into one of said openings, complementary interfacing annular surfaces on the inner member and outer members which limit radial movements of the inner member relative to the outer member, such annular surfaces being substantially concentric and the annular surface of the inner member being of a somewhat larger diameter than the annular surface of the outer member, whereby radial movement and resulting displacement of one member relative to the other member is limited by the annular surfaces, and the pins interlock in the openings as a function of the displacement of one member relative to the other member.

* * * * *

UNITED STATES PATENT OFFICE
CERTIFICATE OF CORRECTION

PATENT NO. : 3,948,563
DATED : April 6, 1976
INVENTOR(S) : Henry Replin

It is certified that error appears in the above-identified patent and that said Letters Patent are hereby corrected as shown below:

Column 1, line 44, after "tire" insert --and--.

Column 3, line 1, delete "to" (First Occurrence), and substitute --of--.

Column 6, line 45, after "36" insert --to--.

Column 6, line 59, delete "the" (Second Occurrence), and substitute --this--.

Column 9, line 23, delete "509" and substitute --50--.

Column 11, line 53, delete "35" and substitute --36--.

Column 15, line 18, after "defined" insert --in--.

Column 16, line 37, after "of" insert --an--.

Column 18, line 19, delete "members" and substitute --member--.

Signed and Sealed this eighth Day of June 1976

[SEAL]

Attest:

RUTH C. MASON
Attesting Officer

C. MARSHALL DANN
Commissioner of Patents and Trademarks